(12) United States Patent
Bhardwaj et al.

(10) Patent No.: US 10,318,096 B2
(45) Date of Patent: Jun. 11, 2019

(54) INTELLIGENT PRODUCTIVITY MONITORING WITH A DIGITAL ASSISTANT

(71) Applicant: Microsoft Technology Licensing, LLC, Redmond, WA (US)

(72) Inventors: Abhishek Bhardwaj, Santa Clara, CA (US); Aditya Vegesna, Redmond, WA (US); Anuja Chetan Shah, Bellevue, WA (US); Arnold Paul Pereira, Bellevue, WA (US); Chaitanya Krishna Donthini, Bellevue, WA (US); Gautam Dambekodi Navinchand, Seattle, WA (US); Sachit Muckaden, Bellevue, WA (US); Shefali Vohra, Bellevue, WA (US); Vignesh Shenoy, Redmond, WA (US); Yuvek Lokesh Mehta, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 294 days.

(21) Appl. No.: 15/267,331

(22) Filed: Sep. 16, 2016

(65) Prior Publication Data
US 2018/0081496 A1    Mar. 22, 2018

(51) Int. Cl.
*G06F 3/0481*   (2013.01)
*G06F 3/16*   (2006.01)
(Continued)

(52) U.S. Cl.
CPC ............ *G06F 3/0481* (2013.01); *G06F 3/011* (2013.01); *G06F 3/0488* (2013.01); *G06F 3/167* (2013.01); *H04L 67/22* (2013.01)

(58) Field of Classification Search
CPC ......... G06F 3/0481; G06F 3/167; G06F 3/017
See application file for complete search history.

(56) References Cited

U.S. PATENT DOCUMENTS 7,958,234 B2    6/2011   Thomas et al.
8,843,106 B2    9/2014   Pons Prieto et al.
(Continued)

FOREIGN PATENT DOCUMENTS

WO    2010131259 A2    11/2010

OTHER PUBLICATIONS

"Timesheet" Published on: Feb. 15, 2015 Available at: http://llamalab.com/timesheet/ (4 pages total).
(Continued)

*Primary Examiner* — Andrea C Leggett
(74) *Attorney, Agent, or Firm* — Mark K. Young; Mayer & Williams PC

(57) ABSTRACT

A digital assistant supported across devices such as smartphones, tablets, personal computers (PCs), wearable computing devices, game consoles, and the like is configured to interact with a productivity system so that various user experiences, content, or features that enhance a user's productivity can be integrated with the digital assistant and rendered as a native digital assistant user experience. The digital assistant is configured to actively participate with the user to set and achieve productivity goals for example, by determining the user's intent, maintaining awareness of context, performing tasks and actions, providing productivity status and notifications, and interacting with the user to help the user stay productive and avoid distractions.

19 Claims, 28 Drawing Sheets

(51) Int. Cl.
*G06F 3/0488* (2013.01)
*G06F 3/01* (2006.01)
*H04L 29/08* (2006.01)

(56) References Cited

U.S. PATENT DOCUMENTS

| | | |
|---|---|---|
| 2005/0120113 A1 | 6/2005 | Bunch et al. |
| 2007/0043687 A1 | 2/2007 | Bodart et al. |
| 2009/0187443 A1 | 7/2009 | Hart |
| 2009/0193360 A1 | 7/2009 | Escuer |
| 2011/0302003 A1 | 12/2011 | Shirish et al. |
| 2015/0112791 A1 | 4/2015 | Jain |
| 2015/0149390 A1 | 5/2015 | Brdiczka et al. |

OTHER PUBLICATIONS

"RescueTime", Retrieved on: Feb. 17, 2016 Available at: https://www.rescuetime.com/ (4 pages total).

INTELLIGENT PRODUCTIVITY MONITORING WITH A DIGITAL ASSISTANT

BACKGROUND

Digital assistants can provide a variety of features for device users and can make it easier to interact with devices to perform tasks, get information, and stay connected with friends and colleagues using voice interactions and other inputs. Digital assistants are sometimes referred to as "virtual assistants."

SUMMARY

A digital assistant supported across devices such as smartphones, tablets, personal computers (PCs), wearable computing devices, game consoles, and the like is configured to interact with a productivity system so that various user experiences, content, or features that enhance a user's productivity can be integrated with the digital assistant and rendered as a native digital assistant user experience. The digital assistant is configured to actively participate with the user to set and achieve productivity goals for example, by determining the user's intent, maintaining awareness of context, performing tasks and actions, providing productivity status and notifications, and interacting with the user to help the user stay productive and avoid distractions.

In various illustrative examples, the productivity system can be implemented using locally instantiated components including application and browser monitors and a productivity client that interoperates with a remote productivity service. The productivity service may be incorporated into an existing digital assistant service in some implementations. The productivity system exposes a user interface for the user to set productivity goals and/or preferences, tracks the time the user spends on applications and websites, and classifies the applications and websites into categories such as productivity, social, entertainment, news/information, and the like.

The productivity system may interoperate with the digital assistant to proactively take actions to assist the user in meeting a productivity goal when the productivity system observes the user falling behind or predicts that the user may miss a goal. By leveraging knowledge of the user, relevant context, and its access to a large database of information, the digital assistant can take informed and intelligent steps to help the user stay focused and free up time to put to productive use. For example, the digital assistant can reschedule a meeting, screen incoming phone calls, suggest tools and resources that can be applied to a task at hand, and read incoming emails to identify tasks and add them to the user's to do list.

The productivity system can generate productivity feedback that the digital assistant can render in visual form such as charts and graphs on a device display, or send as text or email. The digital assistant can also provide productivity feedback verbally using synthesized speech.

The productivity monitoring with a digital assistant can increase the efficiency of the human-machine interface between the user and the devices by providing the feedback that enables the user to effectively manage device use to achieve productivity goals. For example, the feedback helps the user stay focused and avoid distractions while using a device which can minimize the idle time of the device where user productivity is low but limited resources such as battery power are still consumed. The automated and proactive steps taken by the productivity system and digital assistant to keep the user on track to meet goals can further enhance device operation efficiency by reducing the opportunity for user input errors. For example, the digital assistant can send out messages on behalf of the user to reschedule a group meeting. Such automated features provided by the digital assistant can also be expected to be more efficient than manual operations performed by a user which may be time consuming and prone to error. Such increased efficiency may enable the device to better utilize available computing resources including network bandwidth, processing cycles, memory, and battery life in some cases.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It may be appreciated that the above-described subject matter may be implemented as a computer-controlled apparatus, a computer process, a computing system, or as an article of manufacture such as one or more computer-readable storage media. These and various other features may be apparent from a reading of the following Detailed Description and a review of the associated drawings.

DETAILED DESCRIPTION

Figure 1:
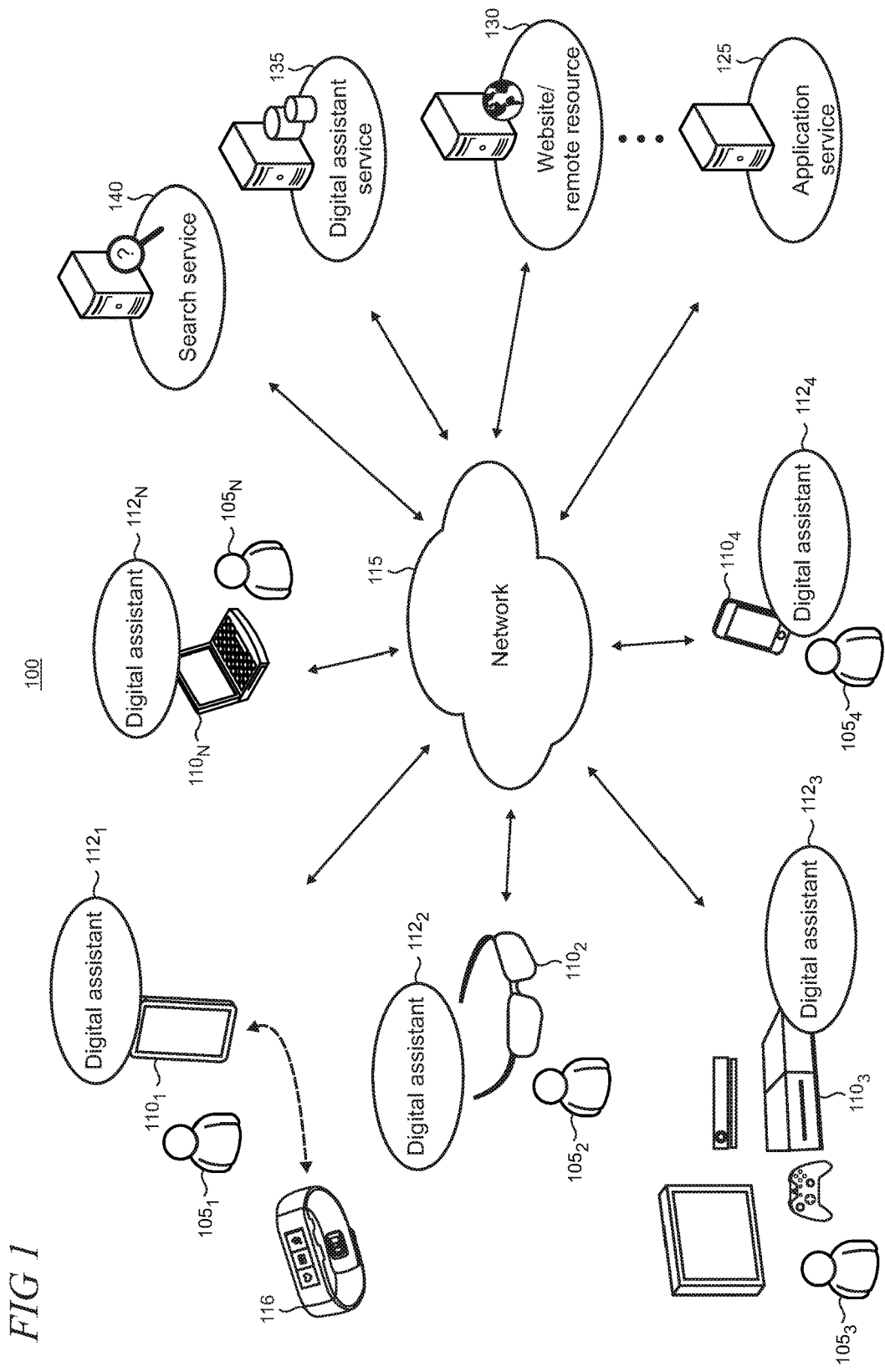
FIG. 1 shows an illustrative computing environment in which devices supporting a digital assistant can communicate and interact with various services over a network.

FIG. 1 shows an illustrative computing environment 100 in which the same or different users 105 may employ devices 110 that can communicate with other devices and various services over a network 115. Each device 110 may include an instance of a digital assistant 112. The devices 110 can support voice telephony capabilities in some cases and typically support data-consuming applications such as Internet browsing and multimedia (e.g., music, video, etc.) consumption in addition to various other features. The devices 110 may include, for example, user equipment, mobile phones, cell phones, feature phones, tablet computers, and smartphones which users often employ to make and receive voice and/or multimedia (i.e., video) calls, engage in messaging (e.g., texting) and email communications, use applications and access services that employ data, browse the World Wide Web, and the like.

Other types of electronic devices are also envisioned to be usable within the environment 100 including handheld computing devices, PDAs (personal digital assistants), portable media players, devices that use headsets and earphones (e.g., Bluetooth-compatible devices), phablet devices (i.e., combination smartphone/tablet devices), wearable computing devices such as head-mounted display (HMD) systems and smartwatches, navigation devices such as GPS (Global Positioning System) systems, laptop PCs (personal computers), desktop computers, multimedia consoles, gaming systems, or the like. In the discussion that follows, the use of the term "device" is intended to cover all devices that are configured with communication capabilities and are capable of connectivity to the network 115.

The various devices 110 in the environment 100 can support different features, functionalities, and capabilities (here referred to generally as "features"). Some of the features supported on a given device can be similar to those supported on others, while other features may be unique to a given device. The degree of overlap and/or distinctiveness among features supported on the various devices 110 can vary by implementation. For example, some devices 110 can support touch controls, gesture recognition, and voice commands, while others may enable a more limited user interface. Some devices may support video consumption and Internet browsing, while other devices may support more limited media handling and network interface features.

Accessory devices 116, such as wristbands and other wearable computing devices may also be present in the environment 100. Such accessory device 116 typically is adapted to interoperate with a coupled device 110 using a short range communication protocol like Bluetooth to support functions such as monitoring of the wearer's fitness and/or physiology (e.g., heart rate, steps taken, calories burned, etc.) and environmental conditions (temperature, humidity, ultra-violet (UV) levels, etc.), and surfacing notifications from the coupled device 110. Some accessory devices can be configured to work on a standalone basis (i.e., without relying on a coupled device 110 for functionality such as Internet connectivity) as wearable computing devices that may support an operating system and applications.

The devices 110 can typically utilize the network 115 in order to access and/or implement various user experiences. The network can include any of a variety of network types and network infrastructure in various combinations or subcombinations including cellular networks, satellite networks, IP (Internet-Protocol) networks such as Wi-Fi under IEEE 802.11 and Ethernet networks under IEEE 802.3, a public switched telephone network (PSTN), and/or short range networks such as Bluetooth® networks. The network infrastructure can be supported, for example, by mobile operators, enterprises, Internet service providers (ISPs), telephone service providers, data service providers, and the like.

The network 115 may utilize portions of the Internet or include interfaces that support a connection to the Internet so that the devices 110 can access content and render user experiences provided by various remote or cloud-based application services 125 and websites 130. The application services 125 and websites 130 can support a diversity of features, services, and user experiences such as social networking, mapping, news and information, entertainment, travel, productivity, finance, etc. A digital assistant service 135 and search service 140 (each described in more detail below) are also present in the computing environment 100.

Figure 2:
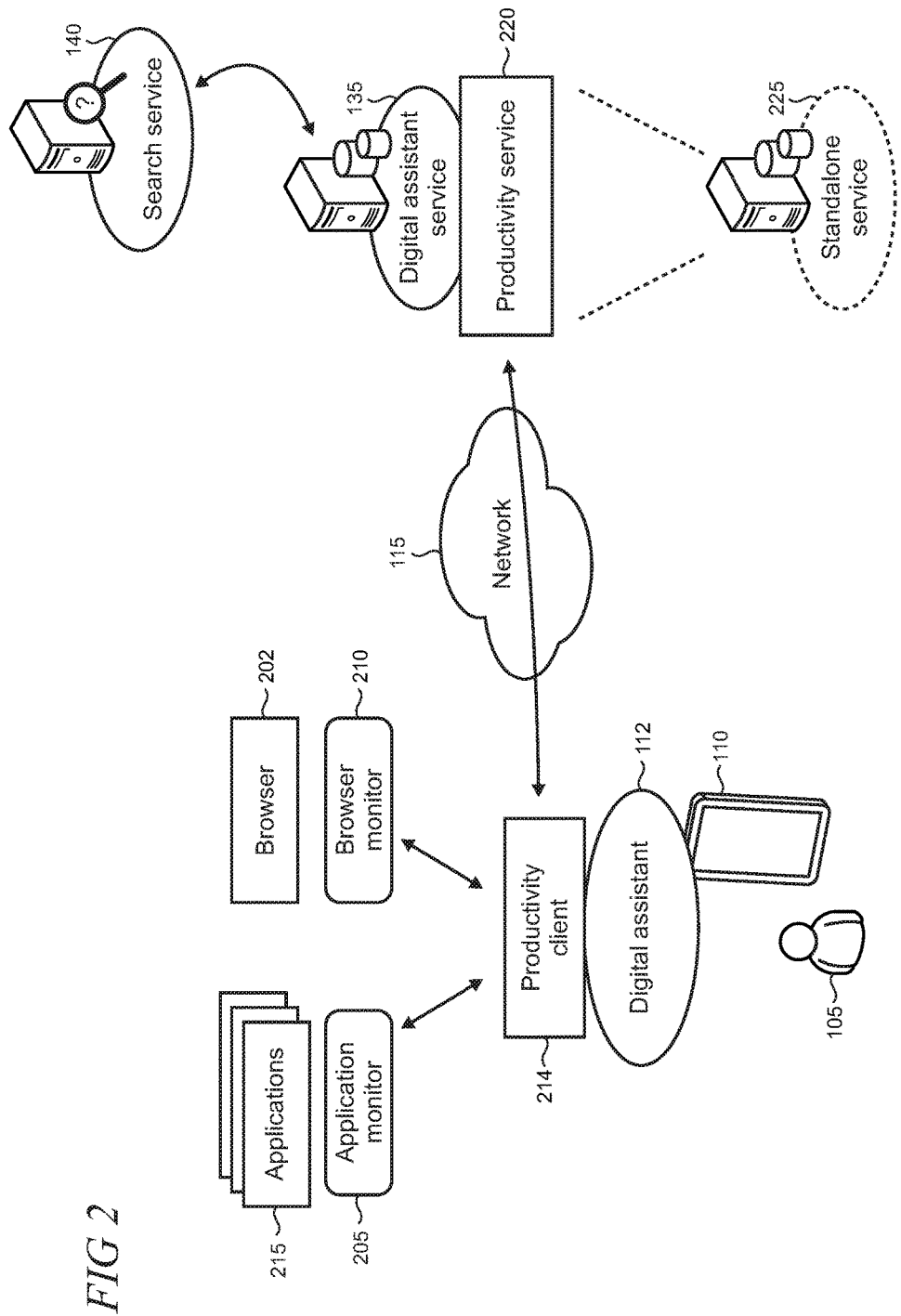
FIG. 2 shows a local productivity client interacting with a remote productivity service.

As shown in FIG. 2, a device 110 can include local components such as a browser 202 and/or one or more applications 215 that can respectively facilitate interaction with one or more websites 130 and remote application services 125. For example, in some use scenarios, a user 105 may launch a locally executing application that communicates over the network 115 to an application service 125 (FIG. 1) in order to retrieve data and obtain services to enable various features and functions, provide information, and/or support user experiences that can be supported on various ones of the user interfaces on a local device 110 such as graphical user interfaces (GUIs) and audio user interfaces. In some use scenarios and/or at different times, an application 215 may operate locally on the device without needing to interface with a remote service.

The local digital assistant 112 interoperates in this illustrative example with a local productivity client 214 that typically communicates over the network 115 with a remote productivity service 220 that is supported by the remote digital assistant service 135. In this particular example, the productivity client is configured to interact with the digital assistant 112, and the productivity service 220 is supported by the digital assistant service 135. However, the productivity client can be separately instantiated from the digital assistant in some cases. In addition, the productivity service 220 may be optionally provided in whole or part (as indicated by the dashed lines) by a standalone service 225 or be incorporated into another service.

In some implementations, the productivity client can be arranged as a standalone component that provides features and/or services without interacting with a remote resource or service (aside from periodic updates, and the like). Typically, the interoperability between the productivity system and digital assistant is implemented so that the productivity system can render user experiences, features, and content using the digital assistant with a similar and consistent sound, look, and feel in most cases so that transitions between the productivity system and the digital assistant are handled smoothly and the experiences are rendered seamlessly to the user.

Figure 3:
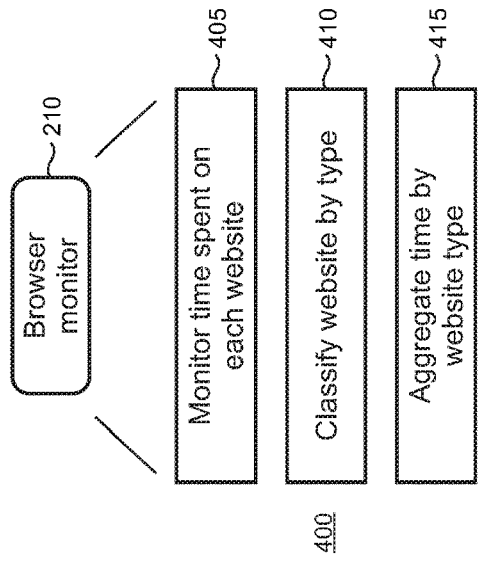
FIG. 3 shows illustrative functions that may be performed by an application monitor.

The productivity client 214 is configured to interoperate with an application monitor 205 and a browser monitor 210. With notice to the user and user consent, the application monitor 205 operates to monitor activities associated with applications 215 on the device 110 so that various data associated with the user's utilization of the applications can be collected. For example, as shown in taxonomy of functions 300 in FIG. 3, the application monitor 205 can be configured to track the time that the user spends utilizing each application 305, classify the applications by type 310, and/or aggregate the usage time by application type 315. The functions 300 are illustrative and not all the functions need to be implemented by the application monitor 205 in every implementation. In some implementations, the application monitor 205 may be configured to distinguish between foreground and background processing of the applications which may provide increased accuracy of application usage. For example, the application monitor can count the time when a given application is in the foreground (e.g., has focus, is consuming user inputs, etc.), but ignore or discount the time when the application is in the background and may not be actively utilized by the user.

The particular application types used in a given implementation can vary. Illustrative application types can include productivity applications such as a word processor, email, presentation, and spreadsheet; social applications such as chat, messaging, media-sharing, and networking; entertainment applications such as gaming, video, and music; and news and information applications. In some implementations, one or more of the functions 300 of the application monitor may be performed, in whole or part, by the productivity client 214, productivity service 220, and/or digital assistant 112. In other implementations, the functions 300 may be performed in conjunction with the search service 140 (FIG. 1).

Figure 4:
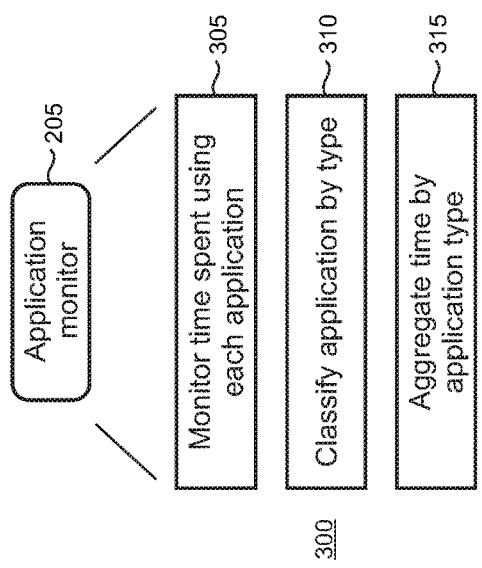
FIG. 4 shows illustrative functions that may be performed by a browser monitor.

As shown in taxonomy of functions 400 in FIG. 4, the browser monitor 210 can be configured to track the time the user spends utilizing websites 405, classify the websites by type 410, and/or aggregate the website time by website type 415. As with the application monitor 205, the browser monitor 210 may distinguish between foreground and background states of the browser 202. The functions 400 are illustrative and not all the functions need to be performed by the browser monitor 210 in every implementation. The website types can vary by implementation and may illustratively include productivity websites, social websites, entertainment websites, and news and information websites. In some implementations, one or more of the functions 400 of the browser monitor can be performed, in whole or part, by the productivity client, productivity service, and/or digital assistant. In other implementations, the functions 400 may be performed in conjunction with the search service 140 (FIG. 1).

Figure 5:
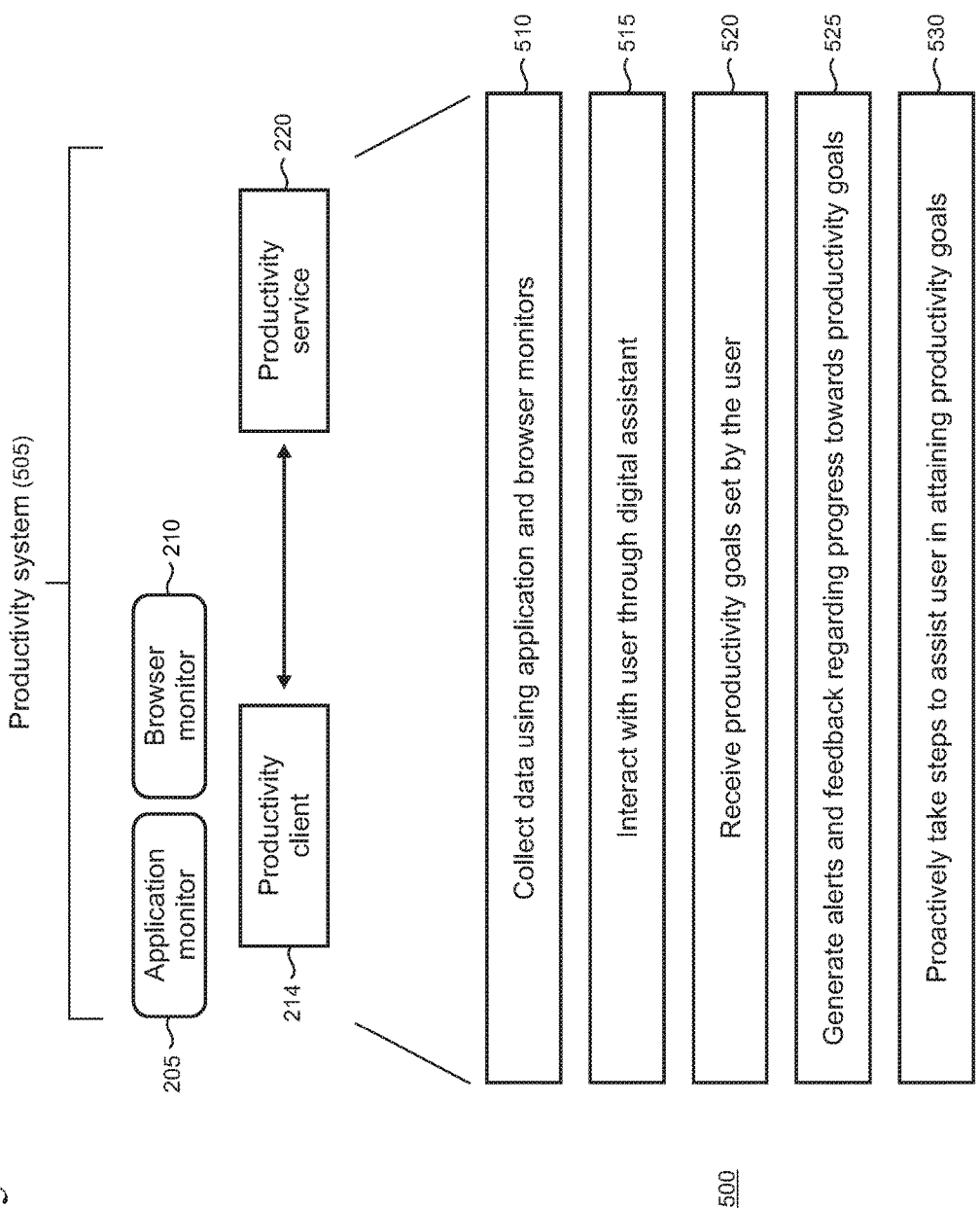
FIG. 5 shows illustrative functions that may be performed by a productivity system.

The productivity client 214, productivity service 220, application monitor 205, and browser monitor 210 are collectively referred to herein as a productivity system 505, as shown in FIG. 5. The productivity system 505 can expose a variety of features and capabilities according to the requirements of a particular implementation of the present intelligent productivity monitoring. For example as shown in taxonomy of functions 500, the productivity system can collect data using the application and browser monitors 510, interact with the user through the digital assistant 515, receive productivity goals set by the user 520, generate alerts and feedback to the user regarding progress towards meeting productivity goals 525, and proactively take steps to assist the user in attaining the user's productivity goals 530. The functions 500 are illustrative and not all the functions need to be performed by the productivity system 505 in every implementation.

Figure 6:
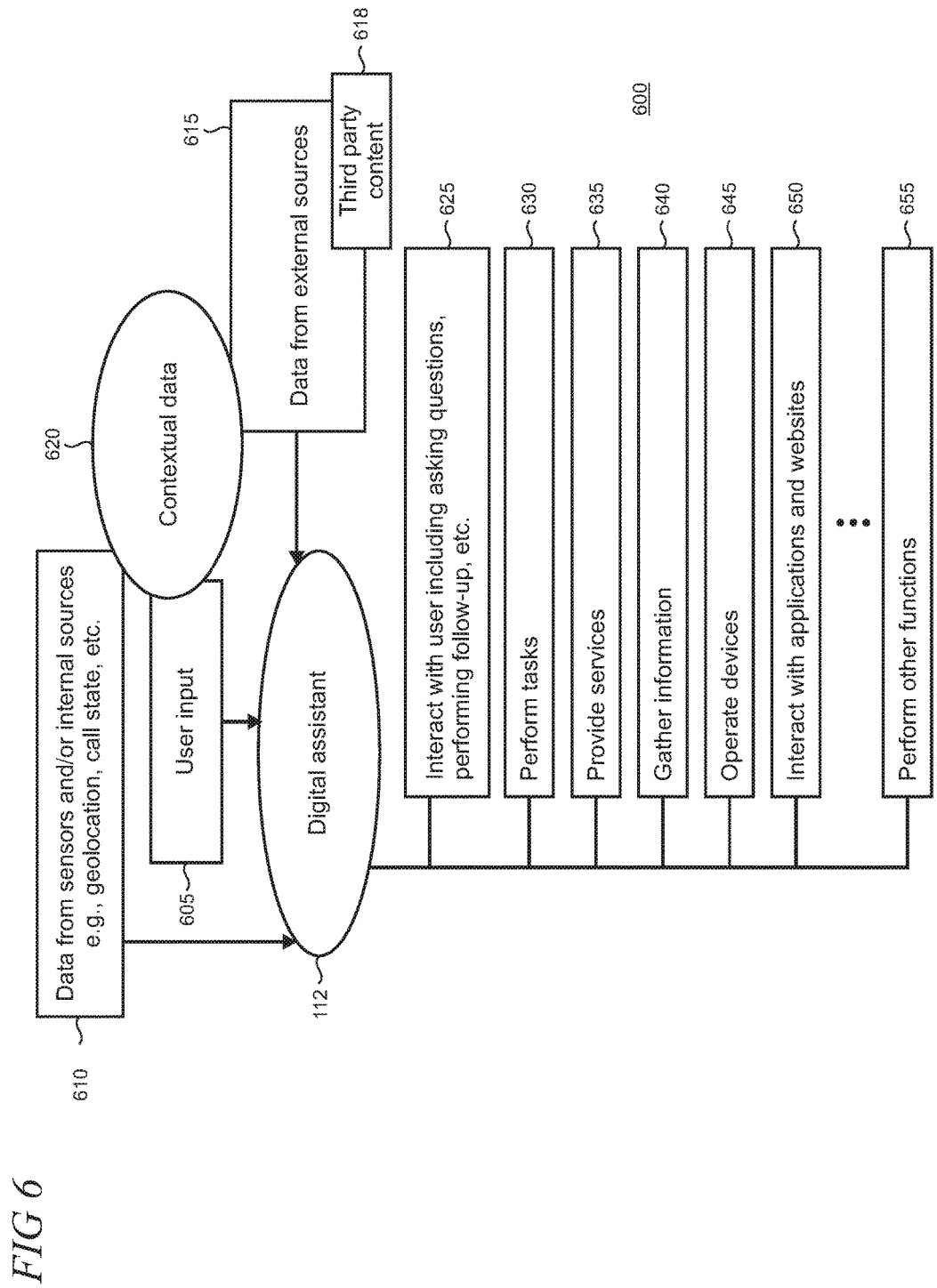
FIG. 6 shows illustrative inputs to a digital assistant and an illustrative taxonomy of general functions that may be performed by a digital assistant.

FIG. 6 shows an illustrative taxonomy of functions 600 that may typically be supported by the digital assistant 112 either natively or in combination with an application 215, browser 202 (FIG. 2), or the productivity system 505 (FIG. 5). Inputs to the digital assistant 112 typically can include user input 605, data from device sensors and/or internal sources 610, and data from external sources 615 which can include third-party content 618. For example, data from internal sources 610 may include the current location of the device 110 that is reported by a GPS (Global Positioning System) component on the device, or some other location-aware component or sensor. The externally sourced data 615 may include data provided, for example, by external systems, databases, services, and the like.

The various inputs can be used alone or in various combinations to enable the digital assistant 112 to utilize contextual data 620 when it operates. Contextual data is data that provides relevant context to a person (e.g., the user), an entity (e.g., one or more devices), or event and can be collected using a sensor package on a device that is configured to sense and analyze data about the user or device environmental surrounding. Sensors in the sensor package may include, for example, camera, accelerometer, location-awareness component, thermometer, altimeter, heart rate sensor, barometer, microphone, or proximity sensor, as described in more detail in the text below accompanying FIG. 35. Contextual data can also be collected from stored data that is associated with a person, entity, or event.

Contextual data can include, for example, time/date, the user's location, speed, acceleration, and/or direction of travel, environmental conditions (e.g., altitude, temperature, barometric pressure), user's physiological state, language, schedule, applications installed on the device, the user's preferences, the user's behaviors (in which such behaviors may be monitored/tracked with notice to the user and the user's consent), stored contacts (including, in some cases, links to a local user's or remote user's social graph such as those maintained by external social networking services), call history, messaging history, browsing history, device type, device capabilities, communication network type and/or features/functionalities provided therein, mobile data plan restrictions/limitations, data associated with other parties to a communication (e.g., their schedules, preferences, etc.), and the like.

As shown, the digital assistant functions 600 illustratively include interacting with the user 625 (through a natural language user interface and other graphical interfaces, for example); performing tasks 630 (e.g., making note of appointments in the user's calendar, sending messages and emails, etc.); providing services 635 (e.g., answering questions from the user, mapping directions to a destination, setting alarms, forwarding notifications, reading emails, news, blogs, etc.); gathering information 640 (e.g., finding information requested by the user about a book or movie, locating the nearest Italian restaurant, etc.); operating devices 645 (e.g., setting preferences, adjusting screen brightness, turning wireless connections such as Wi-Fi and Bluetooth on and off, communicating with other devices, controlling smart appliances, etc.); interacting with applications, websites, and remote services and resources 650; and performing various other functions 655. The list of functions 600 is not intended to be exhaustive and other functions may be provided by the digital assistant 112, applications 215, and/or services/remote resources as may be needed for a particular implementation of the present intelligent productivity monitoring with a digital assistant.

Figure 7:
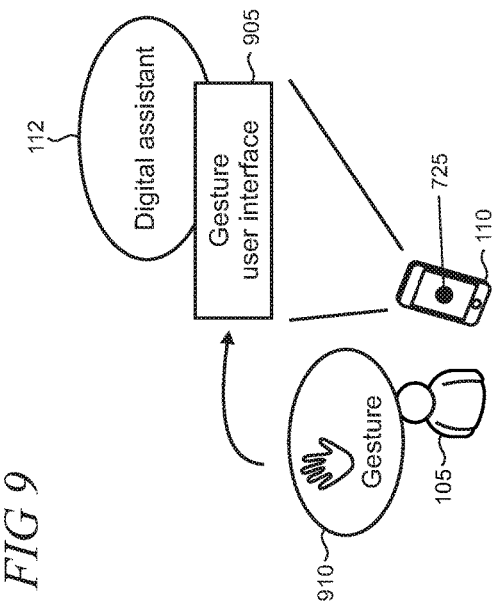
FIGS. 7, 8, and 9 show illustrative interfaces between a user and a digital assistant.

A user can typically interact with the digital assistant 112 in a number of ways depending on the features and functionalities supported by a given device 110. For example, as shown in FIG. 7, the digital assistant 112 may expose a tangible user interface 705 that enables the user 105 to employ physical interactions 710 in support of user experiences on the device 110. Such physical interactions can include manipulation of physical and/or virtual controls such as buttons, menus, keyboards, etc., using touch-based inputs like tapping, flicking, dragging, etc. on a touchscreen supporting a graphical user interface 725, and the like.

Figure 8:
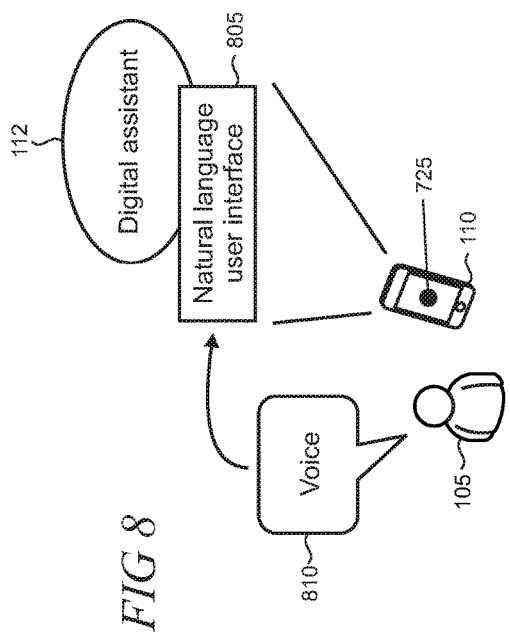

In some implementations, the digital assistant 112 may expose a natural language user interface 805 shown in FIG. 8, or alternatively a voice command-based user interface (not shown), with which the user employs voice 810 to provide various inputs to the device 110.

Figure 9:
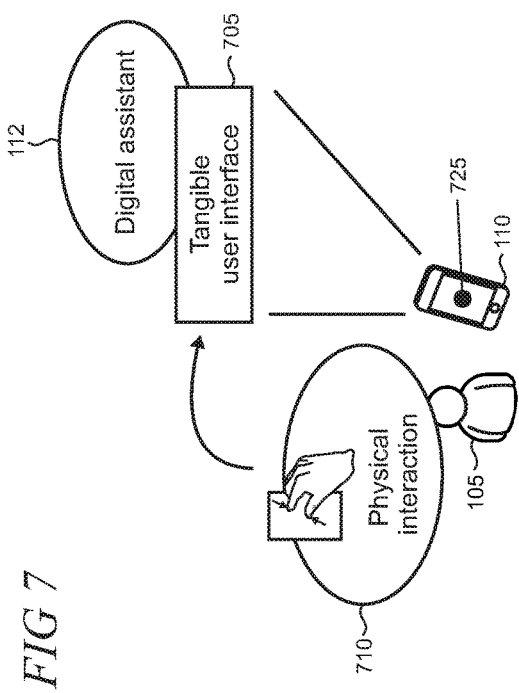

In other implementations, the digital assistant 112 may expose a gesture user interface 905 shown in FIG. 9 with which the user 105 employs gestures 910 to provide inputs to the device 110. The gestures 910 can include touch-based gestures and touchless gestures. It is noted that in some cases, combinations of user interfaces may be utilized where the user may employ, for example, both voice and physical inputs to interact with the digital assistant 112 and the device 110. The user gestures can be sensed using various techniques such as optical sensing, touch sensing, proximity sensing, and the like.

Figure 10:
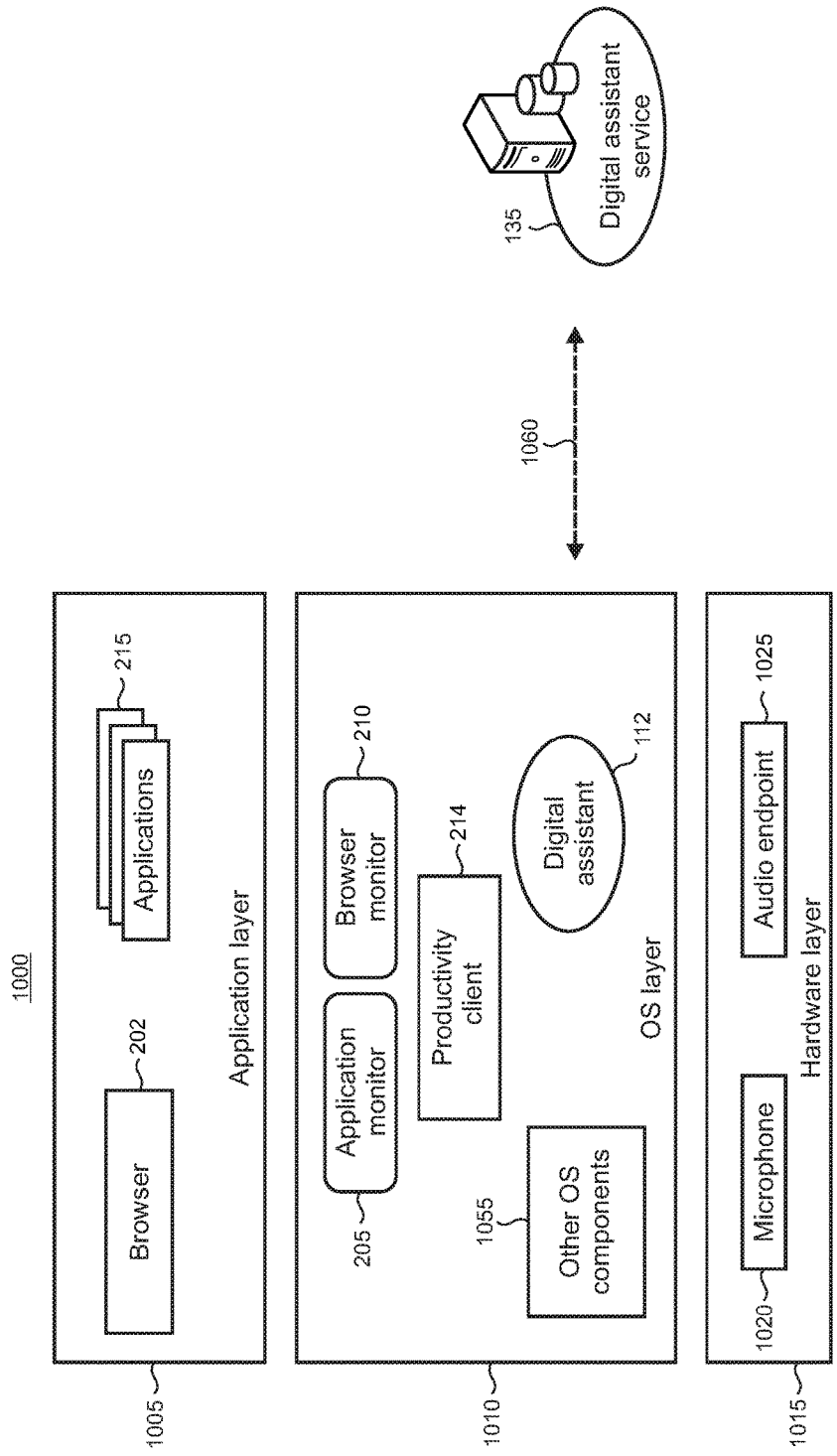
FIG. 10 shows an illustrative layered architecture.

FIG. 10 shows an illustrative layered architecture 1000 that may be instantiated on a given device 110. The architecture 1000 is typically implemented in software, although combinations of software, firmware, and/or hardware may also be utilized in some cases. The architecture 1000 is arranged in layers and includes an application layer 1005, an OS (operating system) layer 1010, and a hardware layer 1015. The hardware layer 1015 provides an abstraction of the various hardware used by the device 110 (e.g., input and output devices, networking and radio hardware, etc.) to the layers above it. In this illustrative example, the hardware layer supports a microphone 1020, and an audio endpoint 1025 which may include, for example, the device's internal speaker, a wired or wireless headset/earpiece, external speaker/device, and the like.

The application layer 1005 in this illustrative example supports the browser 202 and various applications 215 (productivity, social, entertainment, news and information applications, etc.). The browser and each of the applications may be configured to expose an extensibility functionality (not shown) such as an API (application programming interface), or other suitable components to facilitate interactions with the digital assistant and other components in the OS layer. For example, the extensibility functionality may enable the digital assistant to access an email application to retrieve the user's emails and read them aloud to the user. The applications are often implemented using locally executing code. However, in some cases, these applications can rely on services and/or remote code execution provided by remote servers or other computing platforms such as those supported by a service provider or other cloud-based resources.

The OS layer 1010 supports the digital assistant 112, the productivity client 214, the application monitor 205, the browser monitor 210, and various other OS components 1055. In alternative implementations, the productivity client 214, the application monitor 205, and the browser monitor 210 can be optionally instantiated as components in the application layer 1005 (not shown). In typical implementations, the digital assistant 112 can interact with the digital assistant service 135, as indicated by line 1060. That is, the digital assistant 112 in some implementations can partially utilize or fully utilize remote code execution supported at the service 135, or using other remote resources. In addition, it may utilize and/or interact with the other OS components 1055 (and/or other components that are instantiated in the other layers of the architecture 1000) as may be needed to implement the various features and functions described herein. In some implementations, some or all of the functionalities supported by one or more of the productivity client 214, the application monitor 205, and/or the browser monitor 210 can be incorporated into the digital assistant 112 and the particular division of functionality between the components can be selected as a matter of design choice.

Turning now to a presentation of examples of use scenarios, as discussed above in the text accompanying FIG. 5, the productivity system 505 can provide alerts and feedback regarding the user's progress towards achieving a given productivity goal. It is noted that the term "productivity" as used herein may refer to the user's progress towards a given productivity goal. Thus, for example, an increase in user productivity means that the user has increased her progress towards her productivity goal. Other meanings of the term will be apparent from the context with which it is used. The example use scenarios are illustrative and various alternative formats and presentations of information and feedback to the user may be utilized to meet the needs of a particular implementation of productivity monitoring with a digital assistant. In some cases, the productivity system and digital assistant can be configured to give the user significant options and control over how the productivity feedback is provided. For example, the user may control the generation of charts and graphs of productivity information according to user-defined criteria or preferences. In other cases, the productivity system and digital assistant may be configured to provide more limited productivity feedback options to the user.

Figure 12:
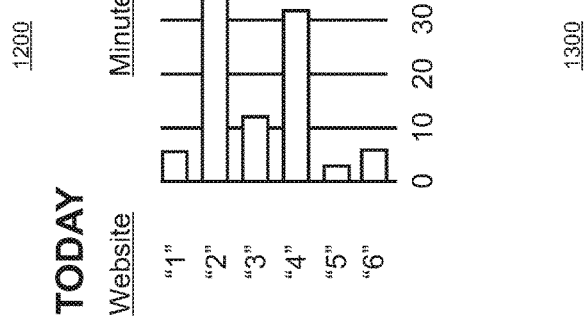
FIGS. 11-17 show illustrative graphs providing productivity feedback to a user that may be generated by a productivity system and displayed on a graphical user interface of a device.
Figure 13:
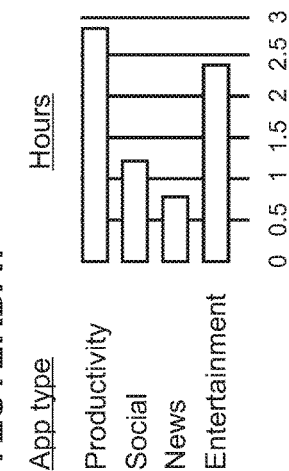
Figure 11:
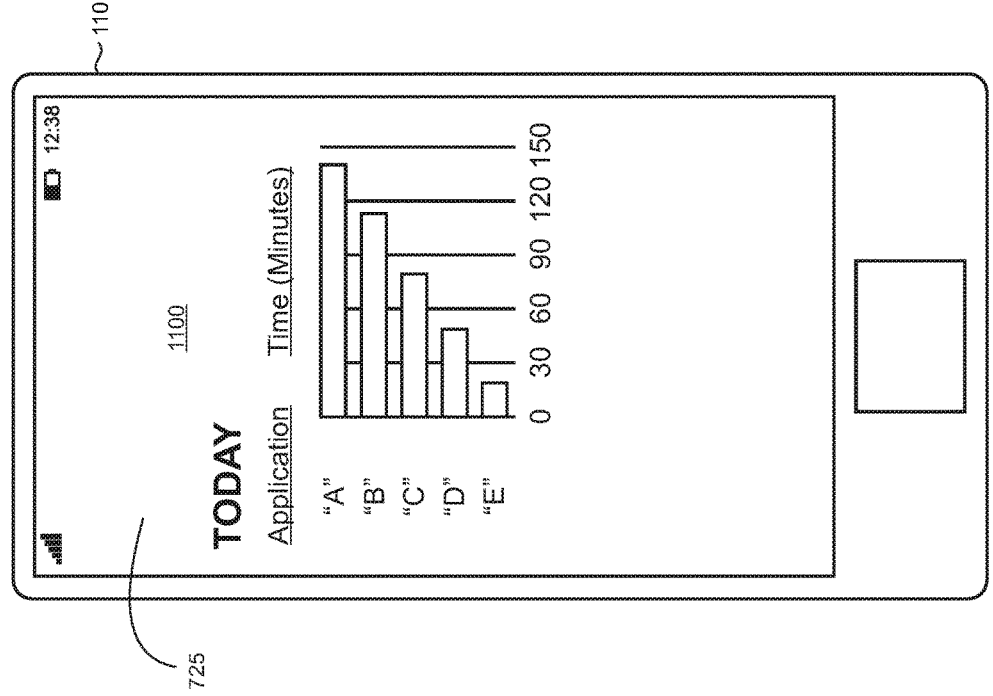
Figure 14:
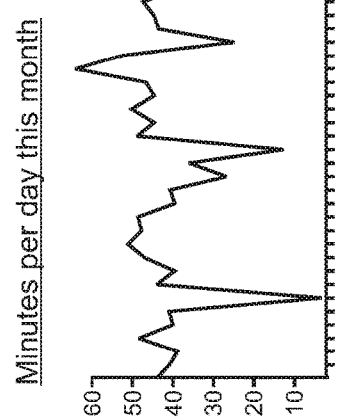
Figure 15:
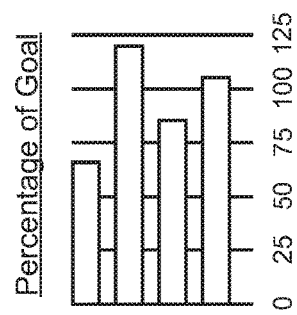

FIG. 11 shows an illustrative example of feedback to the user in the form of a graph 1100 that is rendered on the GUI 725 of a device 110. Graph 1100 comprises a bar chart that provides the cumulative minutes that the user spent with each of five applications over the course of the current day. FIG. 12 shows an illustrative graph 1200 that depicts the cumulative minutes that the user spent on each of six websites during the current day in a bar chart. FIG. 13 shows a graph 1300 depicting hours spent by the user during the previous day with applications by type in a bar chart. FIG. 14 shows a graph 1400 as a bar chart that depicts cumulative hours spent by the user during the workweek using applications that are classified as productivity-type applications. FIG. 15 shows a graph 1500 as a line chart that depicts minutes per day in the current month that the user spent on news and information websites.

Figure 16:
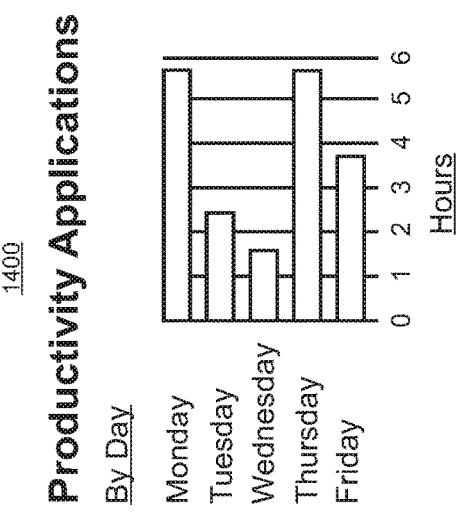
Figure 17:
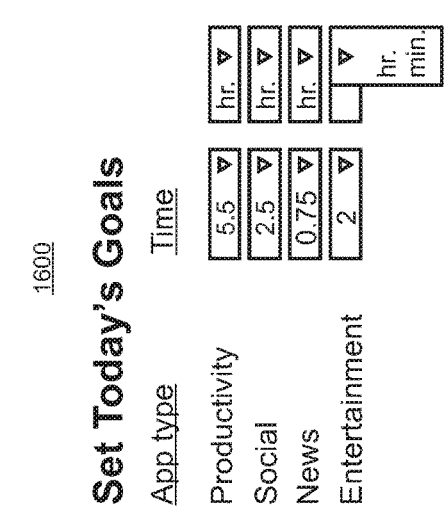

FIG. 16 shows an illustrative example of a GUI 1600 exposed by the productivity system on the device and arranged to enable the user to set productivity goals. In this particular example, the user may access drop down menus to set daily goals by application type. However, various alternative controls, elements, and presentations may be utilized in a given GUI configuration depending on the needs of a particular implementation. The GUI may be arranged, for example, to enable the user to set productivity goals for individual applications and websites over various time periods (hours, days, weeks, years, etc.). As illustratively shown in FIG. 17, the productivity system can generate a graph 1700 as a bar chart that provides feedback to the user regarding the percentage completion of goals by application type.

In addition to using a GUI on the device, the user may interact with the digital assistant in order to set preferences and productivity goals, provide instructions and requests, and receive alerts and feedback. For example, FIGS. 18-29 show transcripts of illustrative user experiences with a digital assistant 112. The illustrated use scenarios include verbal interactions between the user and the digital assistant, but in alternative scenarios, the interactions can be performed through gestures and physical interactions with the device (e.g., through touchscreen interactions and the like). The conversation transcript is indicated by the rectangles while actions are shown using the flags in the drawings. The user 105 can interact with a single instance of the digital assistant 112 on a single device 110, or interact with multiple instances of the digital assistant 112 across multiple devices 110 in some cases. For example, the user may start a conversation with the digital assistant on a PC and then finish the conversation on a smartphone.

Figure 18:
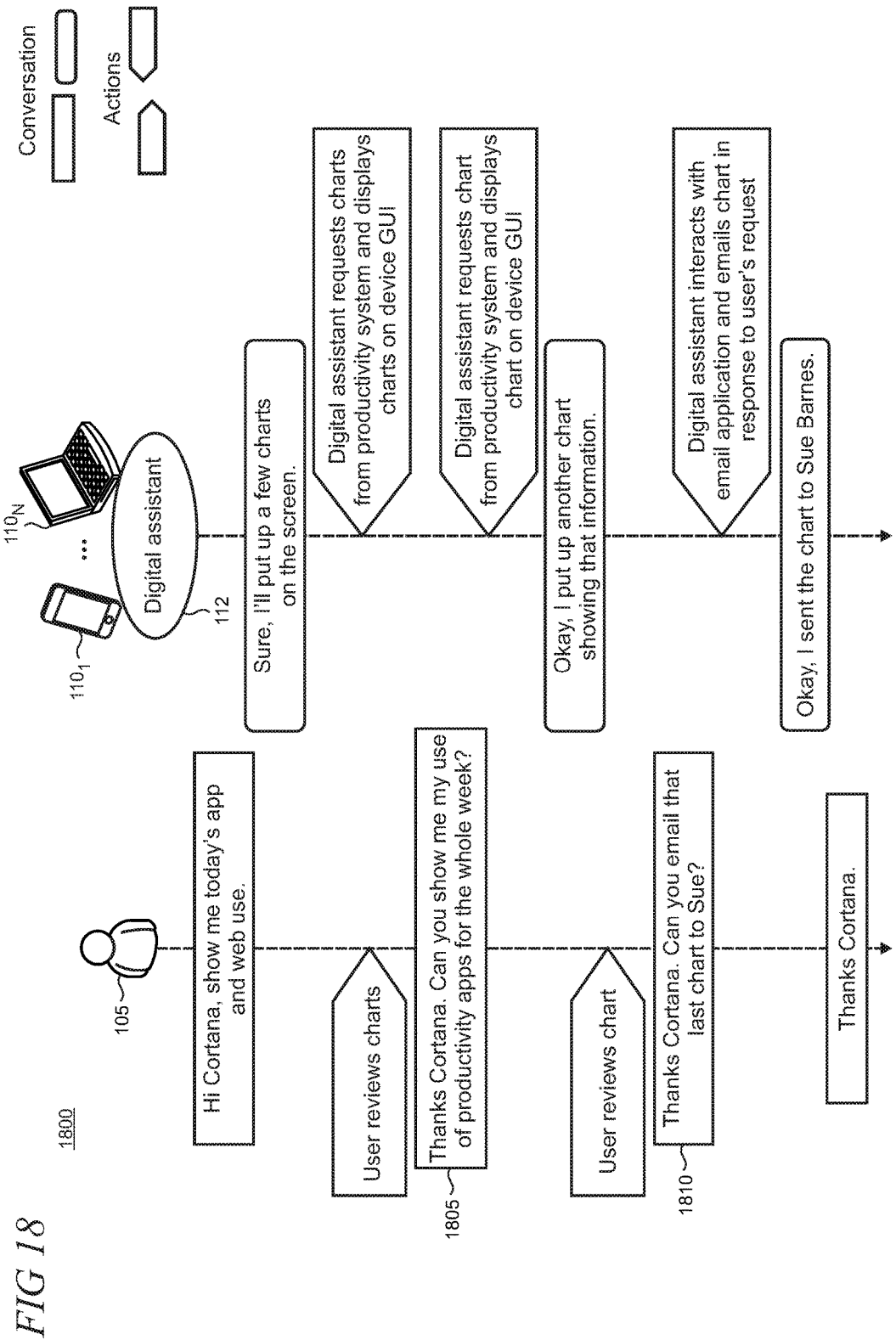
FIGS. 18-29 show transcripts of illustrative user experiences with a digital assistant.

FIG. 18 shows an illustrative transcript for a use scenario 1800 in which the user 105 verbally asks for some feedback from the digital assistant 112 regarding the current day's productivity with applications and websites. The digital assistant makes a request to the productivity system 505 (FIG. 5) which responds by generating one or more graphs or charts. The productivity system can use the information collected by the application and browser monitors to produce the productivity feedback. In some implementations, the productivity system can discern the user's intent regarding the type, amount, and frequency of productivity feedback being sought by applying preferences expressed by the user, utilizing contextual data, and/or applying a history of past interactions with the user.

For example, as shown at block 1805, the user asks to see a particular type of chart. After fulfilling the request, the productivity system can store the user's request and associated context and employ that information to learn how to fulfill future requests from the user. For example, if the productivity system detects a pattern in the user's requests (e.g., the kinds of feedback desired by the user and at what times), the system can proactively take steps to pre-fetch the needed data so that the feedback can be promptly delivered upon request. Alternatively, the productivity system can provide the feedback as an alert (i.e., without prompting by the user).

The user can employ the digital assistant to perform any of a variety of tasks with the productivity information. For example, as shown at block 1810, the user asks the digital assistant to email a productivity chart to one of the user's contacts. The digital assistant can interact with the user's email application to look up the specified contact and send the productivity chart as an attachment to an email message on behalf of the user. In some cases, the digital assistant may utilize available contextual data to determine the intent of the user. In this example, the user may have more than one contact having the first name "Sue." The digital assistant may check the user's schedule and see that the user has an upcoming meeting with a work colleague named "Sue Barnes." The digital assistant applies context to infer that the productivity chart deals with work and the user's next meeting to disambiguate among the user's contacts and send the email to the user's intended contact.

In some cases, the user may prefer that the digital assistant provide productivity information verbally rather than being visually displayed on the device GUI in graph form. For example, the user may ask the digital assistant "Cortana, tell me my progress towards my news application goals for this month." The digital assistant can verbally respond to the user using a synthesized voice with the requested information in such cases. Thus, the digital assistant may be configured to interact with the user with visual and auditory communications.

Figure 19:
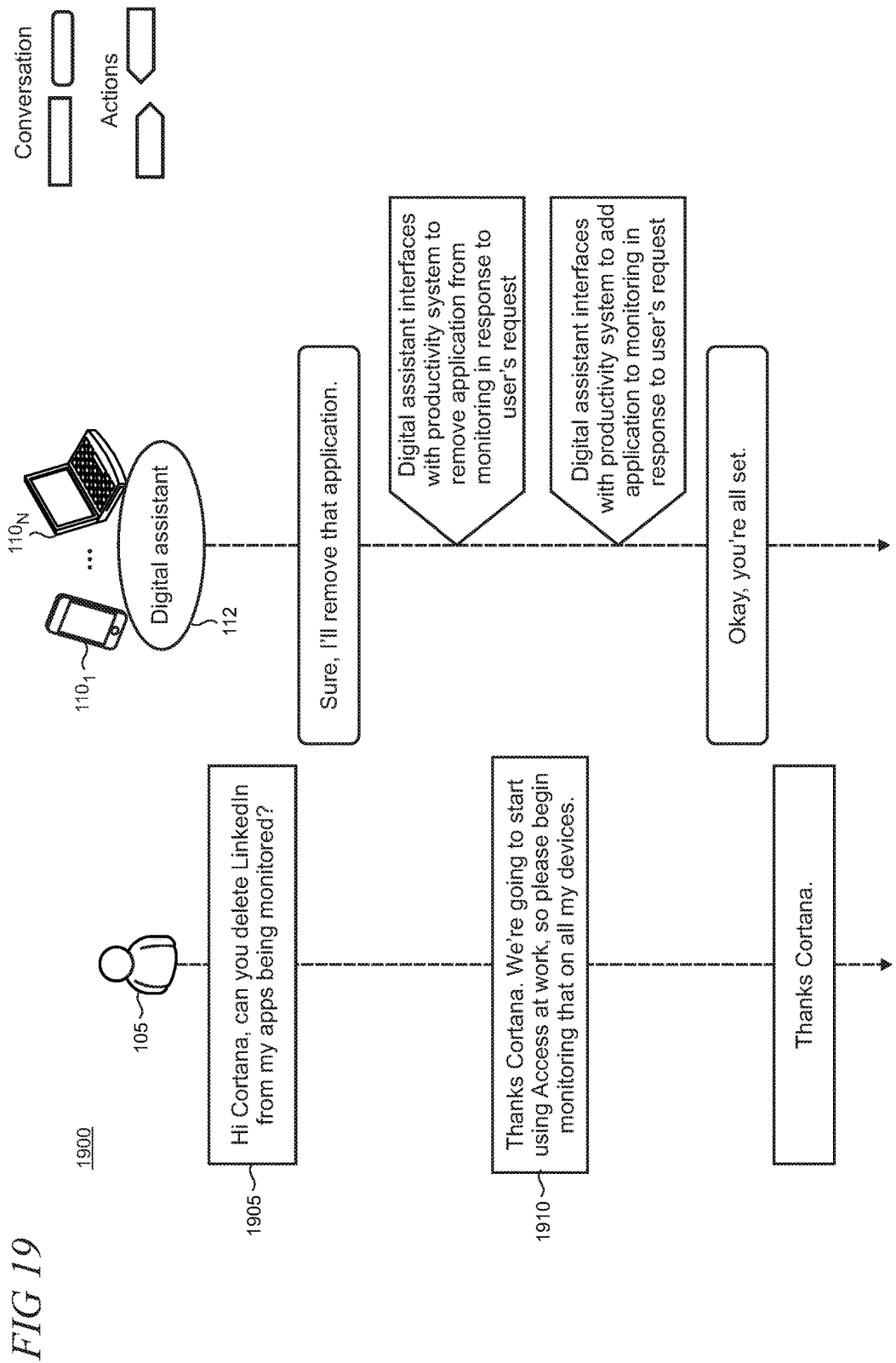

FIG. 19 shows an illustrative transcript for a use scenario 1900 in which the user 105 interacts with the digital assistant 112 to set up which applications and/or websites will be monitored by the productivity system. At block 1905, the user asks the digital assistant to delete an application from productivity monitoring, and at block 1910, the user asks the digital assistant to add a new application to the list of applications being monitored. The digital assistant can interact with the productivity system 505 (FIG. 5) in order to fulfill the user's requests. The monitoring may be performed across all of the user's devices or a subset of devices depending on the user's preferences, settings, or instructions provided to the digital assistant.

Figure 20:
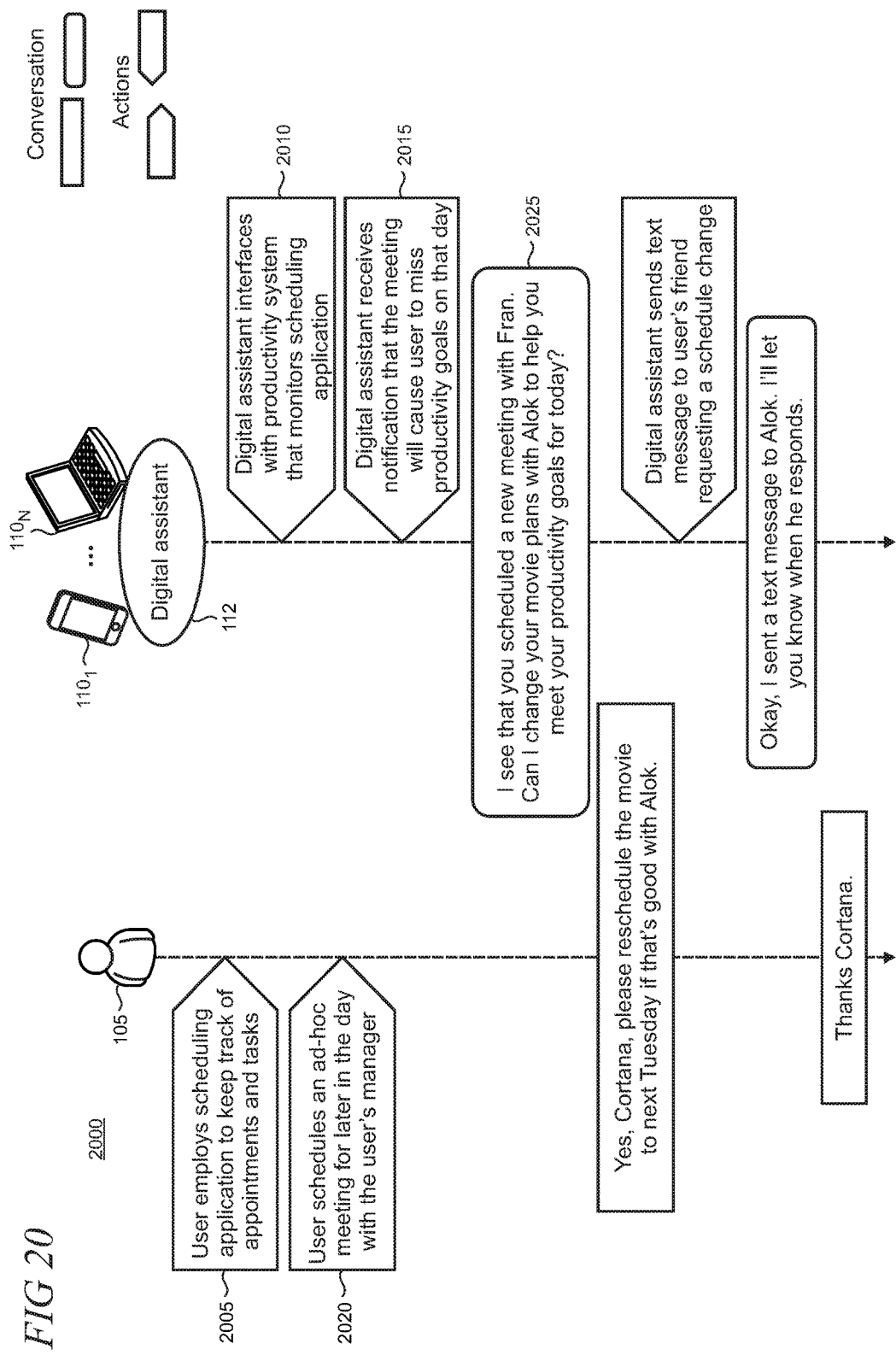

FIG. 20 shows an illustrative transcript for a use scenario in which the digital assistant 112 interacts with the productivity system 505 (FIG. 5) and the user's scheduling application and proactively takes steps to help the user in meeting productivity goals. As shown at block 2005, the user employs a scheduling application to keep track of appointments and tasks. In some cases, the scheduling application can be incorporated into a productivity application that includes email and calendar functionalities, for example. The scheduling application may be monitored by the productivity system 505 (FIG. 5) with which the digital assistant 112 may interact, as shown at block 2010. At block 2015, the digital assistant can be notified, or receive some suitable form of communication from the productivity system when the productivity system predicts that the user may miss a productivity goal. Alternatively, the digital assistant may be configured to query the productivity system for productivity status of the user, for example, periodically or in response to a user input.

The productivity system can make the prediction of missing a productivity goal based on contextual data, past user history, and other suitable factors. For example, by monitoring the user's scheduling application, the system understands when the user has increased her risk of missing her productivity goal when additional tasks or meetings are scheduled. The user may also have a history of behaviors that can give rise to a prediction even in scenarios where explicit data in her calendar is absent. For example, the location awareness component in a device such as GPS (global positioning system) or other suitable component may indicate that the user has a history of walking in a park adjacent to her work location around lunchtime. The productivity system can take such context into account when making a prediction about future events.

The prediction can be made as a probability estimate with an associated measure of confidence in some implementations. In this way, the productivity system can assess the risk of the user missing a productivity goal. The productivity system can apply various heuristics and methodologies to make predictions/risk assessments and suggest and perform actions on behalf of the user which may help to mitigate against the risk. Feedback from the user, or groups of users in a crowd-sourced data collection strategy, can be used to fine tune the heuristics and/or methodologies in some cases to make them more accurate or robust. For example, when the digital assistant makes a suggestion or takes an action to assist the user in mitigating the risk of missing a productivity goal, the success of the suggestion or action in increasing productivity can be observed and used as feedback. The productivity may also correlate user behaviors to productivity so that behaviors and actions that lead to differing levels of productivity can be identified and used by the digital assistant when making suggestions or taking actions regarding the user's productivity.

In an illustrative example, as shown at block 2020, when the user schedules an ad-hoc meeting for later in the day that the productivity system determines could cause a missed goal, the digital assistant can find a course of action to mitigate the time impact of the meeting and suggest it to the user, as shown at block 2025. Here, the digital assistant determines that rescheduling a later social activity can help the user stay on track with her productivity goals by utilizing suitable contextual data from the user's contact schedule and contact list. The digital assistant can access remote services such as a theater information system to find a later show and then use a communications application such as instant messaging to send a message to the user's contact to inform him of the change in plans. In this way, the digital assistant operates to help schedule the user's day in ways that enable the use to stay productive.

Figure 21:
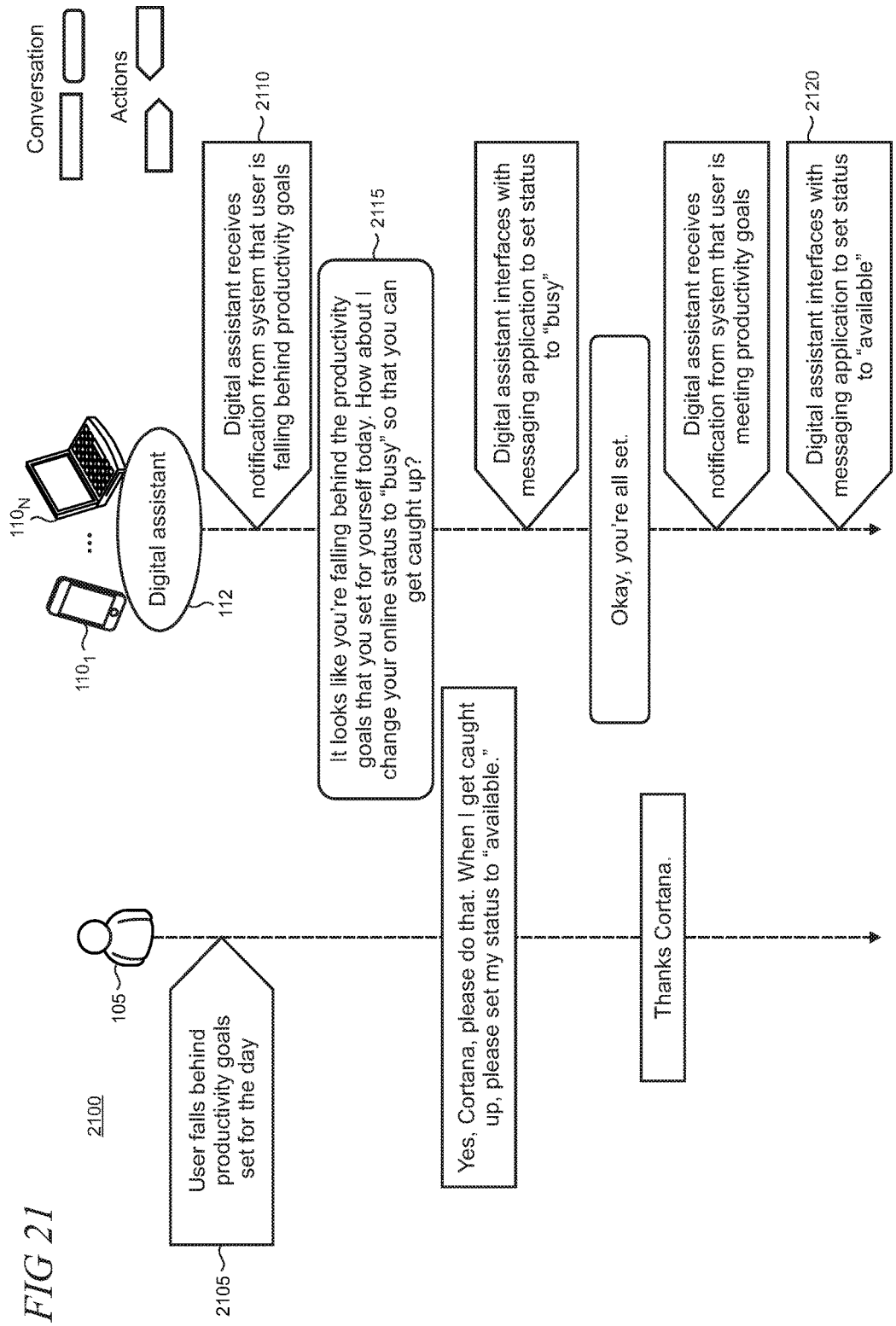

FIG. 21 shows an illustrative transcript for a use scenario 2100 in which the digital assistant 112 can operate as a virtual receptionist to help the user 105 stay productive. When the user falls behind productivity goals that were set (e.g., for that day), as shown at block 2105, the digital assistant 112 receives a notification at block 2110 or other suitable form of communication from the productivity system 505 (FIG. 5) which is monitoring usage applications and websites across the user's devices 110. The digital assistant suggests to the user that her online status be changed, for example, from "available" to "busy" to help reduce distractions from instant messages and the like that other users might otherwise send, as shown at block 2115. When the user gets caught up again in meeting her productivity goals, the digital assistant can change her online status back to "available," as shown at block 2120.

Figure 22:
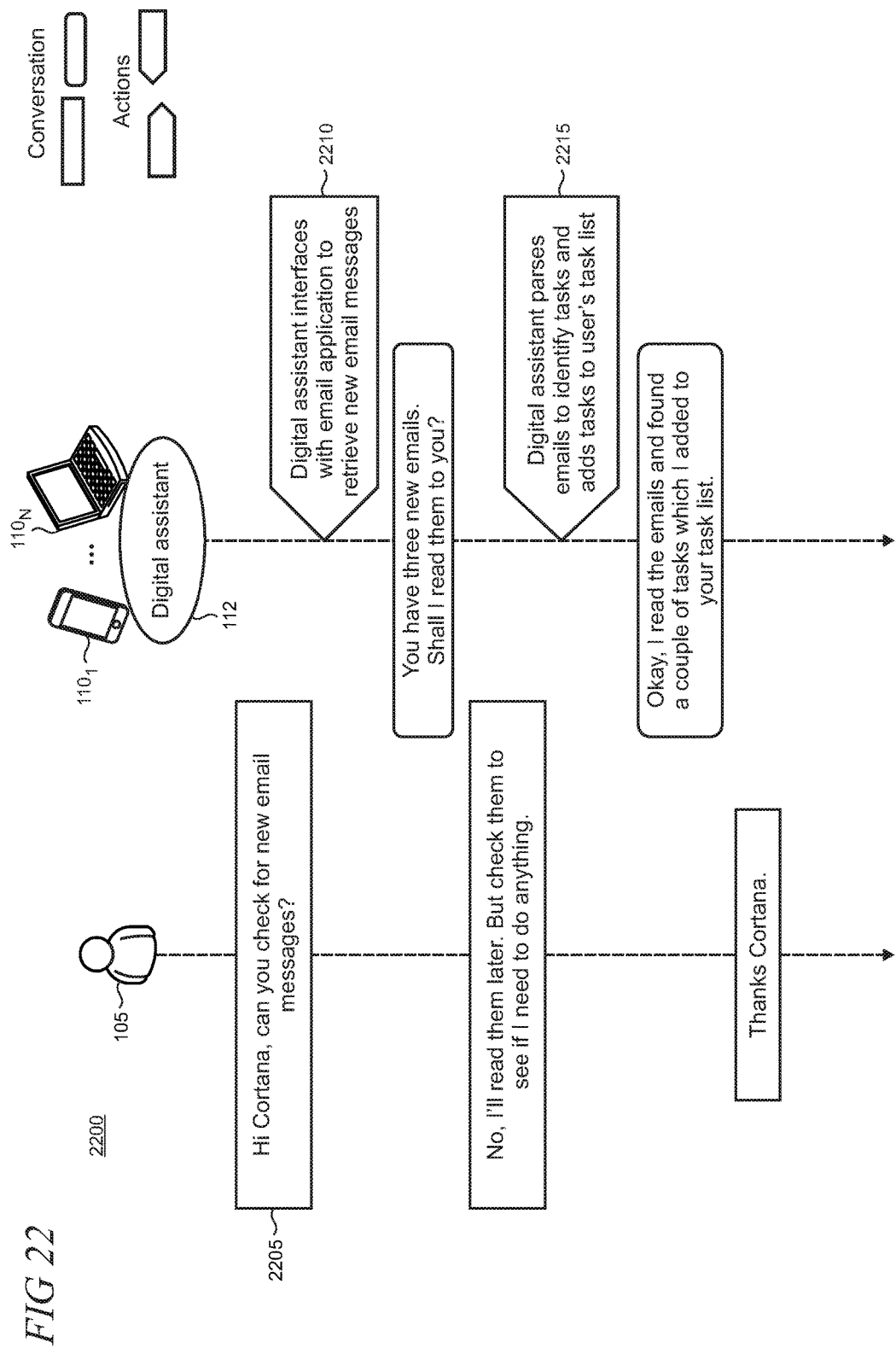

FIG. 22 shows an illustrative transcript for a use scenario 2200 in which the digital assistant 112 reads emails to the user 105 to identify tasks which are added to the user's task list. For example, the user may employ a calendar, scheduling, task management, or other suitable application that runs on her device 110 to track tasks and provide reminders and the like. In response to a voice instruction from the user at block 2205 to check for new emails, the digital assistant interfaces with the user's email application to retrieve new messages at block 2210. At block 2215, the digital assistant parses the retrieved emails to identify tasks for the user. For example, an email from a friend of the user may ask for information about an upcoming event. The digital assistant might add a task to the user's list such as "Respond to Ruchira with details for the party on Sunday" in such case.

Figure 23:
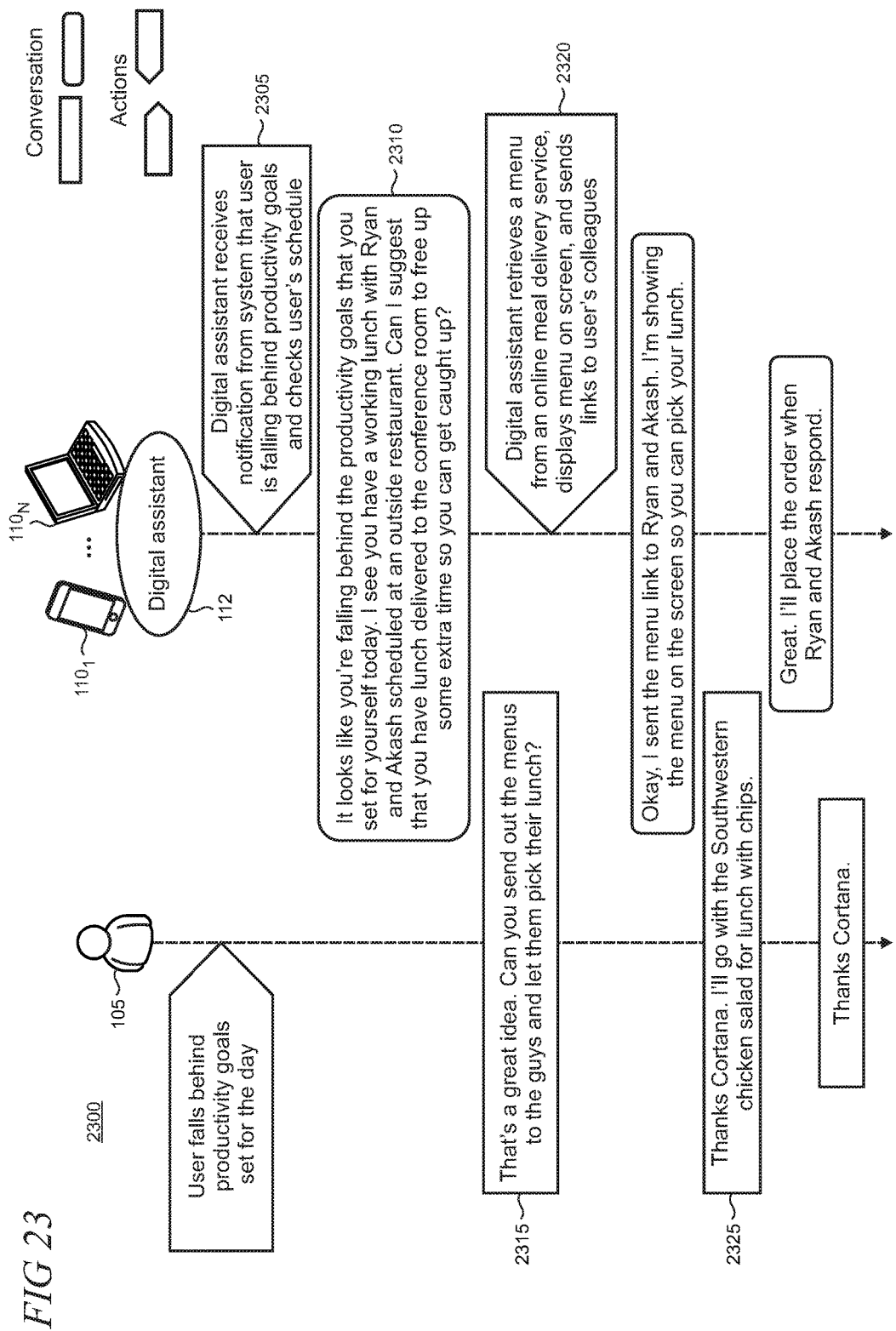

FIG. 23 shows an illustrative transcript for a use scenario 2300 in which the digital assistant 112 can help the user manage meal arrangements to free up time to help the user stay productive. When the digital assistant 112 receives a notification or other suitable form of communication from the productivity system 505 (FIG. 5) which indicates that the user is falling behind her productivity goals, the digital assistant interacts with the user's calendar or scheduling application to check her schedule, as shown at block 2305. Observing that the user has an offsite lunch scheduled with a couple of colleagues, at block 2310, the digital assistant suggests that an onsite lunch meeting take place to save the user time. Alternatively, the digital assistant may search for suitable restaurants that are closer to the user's location at work to save time. When the user asks that menus be shared with her colleagues at block 2315, the digital assistant interacts with an online meal delivery service to retrieve a menu, which it displays on the device for the user, as shown at block 2320. The digital assistant also sends a link to the menu to the user's colleagues, for example using instant messaging, text, email, etc.

When the user and her colleagues make their menu selections for food delivery, the digital assistant can interact with the delivery service to place the order. For example, the user can express her choice verbally to the digital assistant as indicated at block 2325, and the digital assistant can read incoming messages to the user from her colleagues to determine their choices. In some cases, the digital assistant can also handle payment to the service on behalf of the user.

Figure 24:
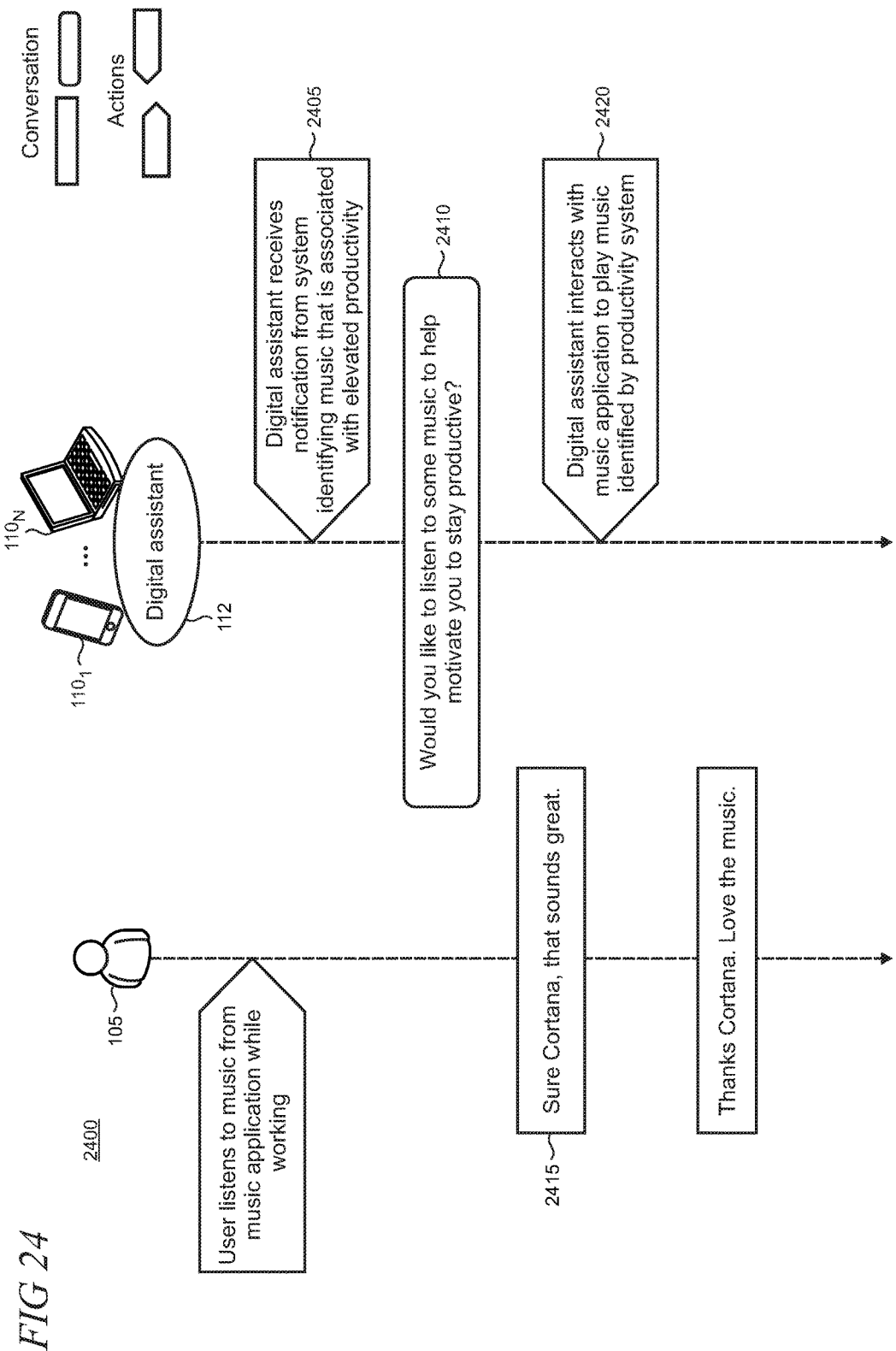

FIG. 24 shows an illustrative transcript for a use scenario 2400 in which the digital assistant 112 interacts with the productivity system 505 (FIG. 5) so that the digital assistant can play music to enhance the user's productivity. The productivity system can monitor the music applications running on one or more of the user's devices 110 over a given time period. The productivity system can then correlate the tracked music to the user's productivity and learn the particular songs, artists, genres, and the like that are associated with elevated productivity. In this particular example, the productivity system provides a notification or other suitable form of communication to the digital assistant that identifies music previously played by the user in the past that is associated with elevated productivity, as shown at block 2405. Alternatively, the productivity system can identify music in response to a query from the digital assistant.

After confirming that the user wants to hear music, as shown at blocks 2410 and 2415, the digital assistant can play the songs on the device identified by the productivity system at block 2420. In some implementations, the digital assistant or productivity system can interact with a music service or database to find and play songs, artists, and/or genres that are similar to the user's previously played music and which may also be expected to motivate the user to stay productive. For example, if the productivity system learns that the user is most productive when listening to up-tempo electronica by one particular artist, then the digital assistant may recommend and play music by another artist in the same or similar genre. The productivity system can correlate the user's productivity with the new music to help refine and tune the recommendation processes and methodologies to improve accuracy and/or robustness.

Figure 25:
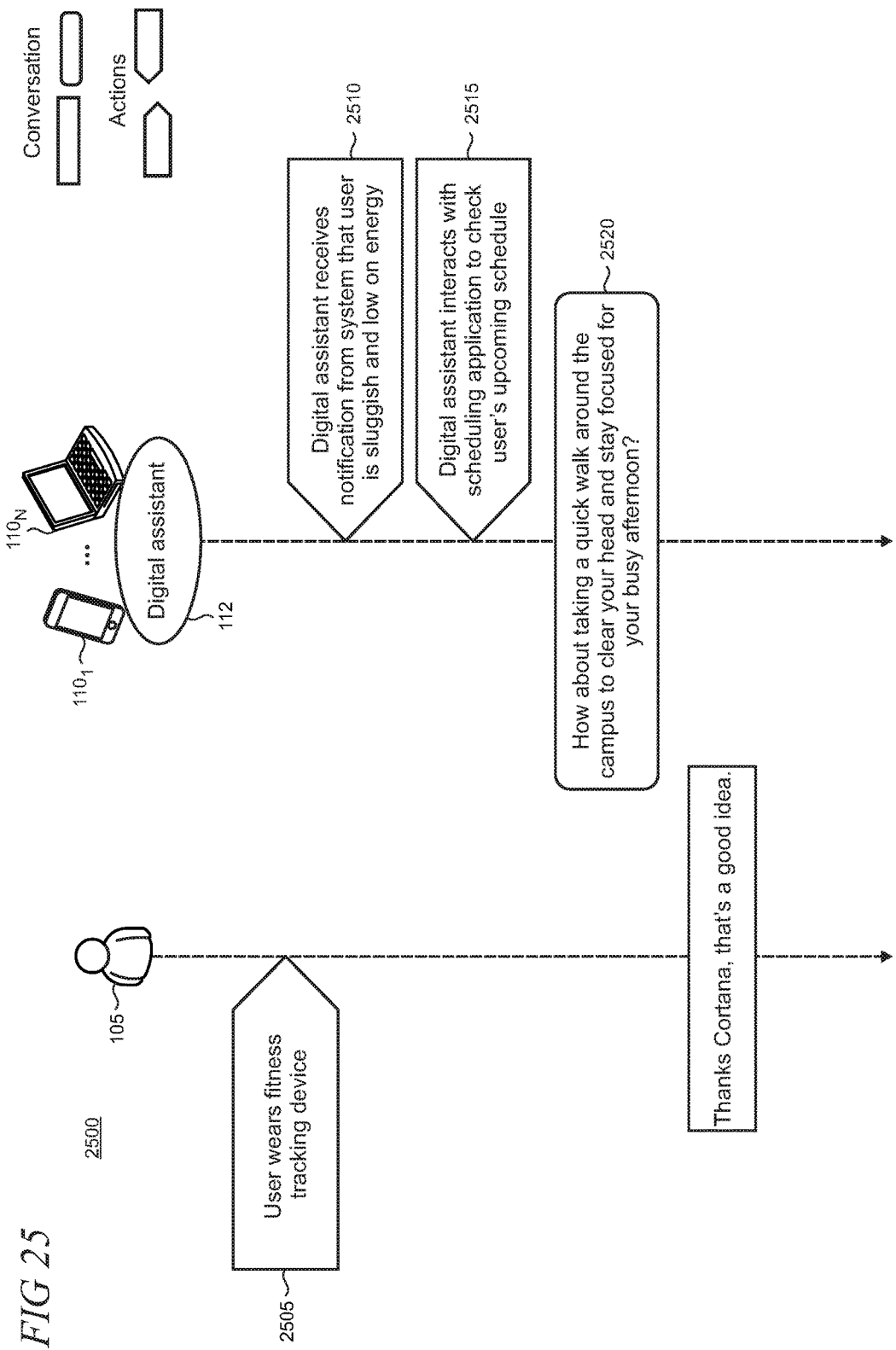

FIG. 25 shows an illustrative transcript for a use scenario 2500 in which the digital assistant 112 interacts with the productivity system 505 (FIG. 5) to monitor the user's energy level and suggest some exercise when the level becomes low. The user may wear a fitness tracking device, as shown at block 2505, or have her physiology monitored using other technologies, such as optical heartrate monitoring or other suitable contact or contactless sensing techniques. The productivity system can interact with an application or other component on the device 110 that is operatively coupled to the fitness tracker to monitor the user's energy level. Based on the application interaction, at block 2510, the productivity system can communicate with the digital assistant (or respond to a query from the digital assistant) and indicate that the user is low on energy or sluggish. At block 2515, the digital assistant checks the user's schedule and determines that she has a busy day planned and suggests some exercise at block 2520 to help the user stay focused and productive.

Figure 26:
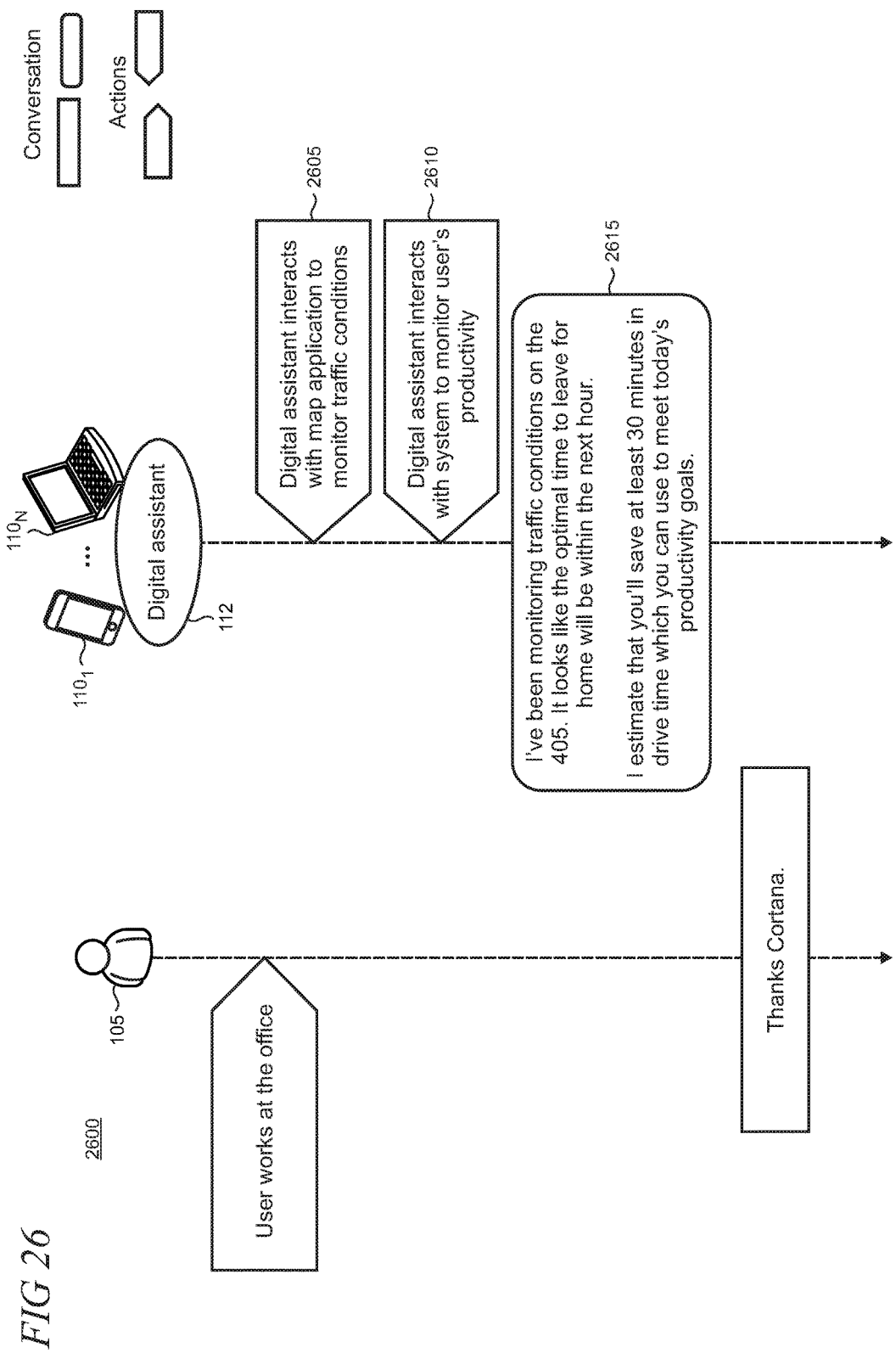

FIG. 26 shows an illustrative transcript for a use scenario 2600 in which the digital assistant 112 interacts with the productivity system 505 (FIG. 5) to monitor traffic conditions to identify time-saving travel strategies for the user.

The digital assistant and/or the productivity system may interact with a map service or application to monitor traffic conditions at block 2605. Using available contextual data (e.g., past user behaviors, appointments in the user's calendar, etc.), the digital assistant can determine that the user intends to leave work to commute home within some particular time window. The digital assistant checks with the productivity system at block 2610 to determine the user's productivity status. Seeing that the user may fall short on her productivity goals, the digital assistant determines a time-saving travel strategy and suggests it to the user at block 2615.

Figure 27:
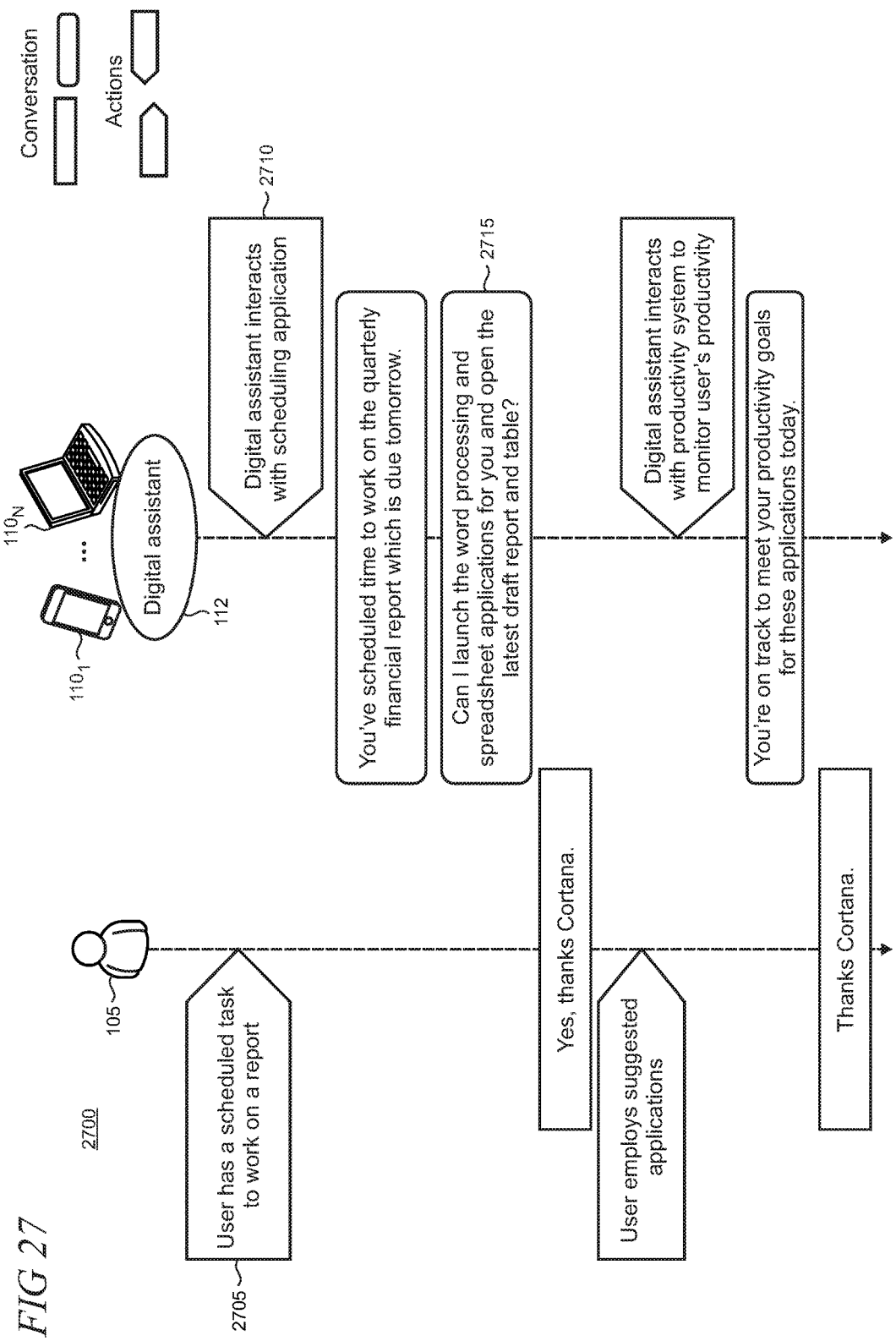

FIG. 27 shows an illustrative transcript for a use scenario 2700 in which the digital assistant 112 interacts with the productivity system 505 (FIG. 5) to identify and suggest applications to help improve the user's productivity. In this example, the user has a scheduled task to work on a quarterly financial report, as shown at block 2705. The digital assistant interacts with the user's scheduling application at block 2710 and sees the scheduled task. Using available context (e.g., the user's past activities on the quarterly financial report or similar projects, the device 110 that the user has available at the time, etc.), the digital assistant can suggest particular applications be launched for the user, at block 2715. Thus, for example, if the user has a PC with a large display available, then the digital assistant might suggest launching both a spreadsheet and word processing application. If however, the user is working with a small form factor tablet or smartphone, the digital assistant may infer that the user does not intend to use the spreadsheet application. The digital assistant may suggest launching just the word processing application in this case so that the user can work on proofreading or editing, for example.

Figure 28:
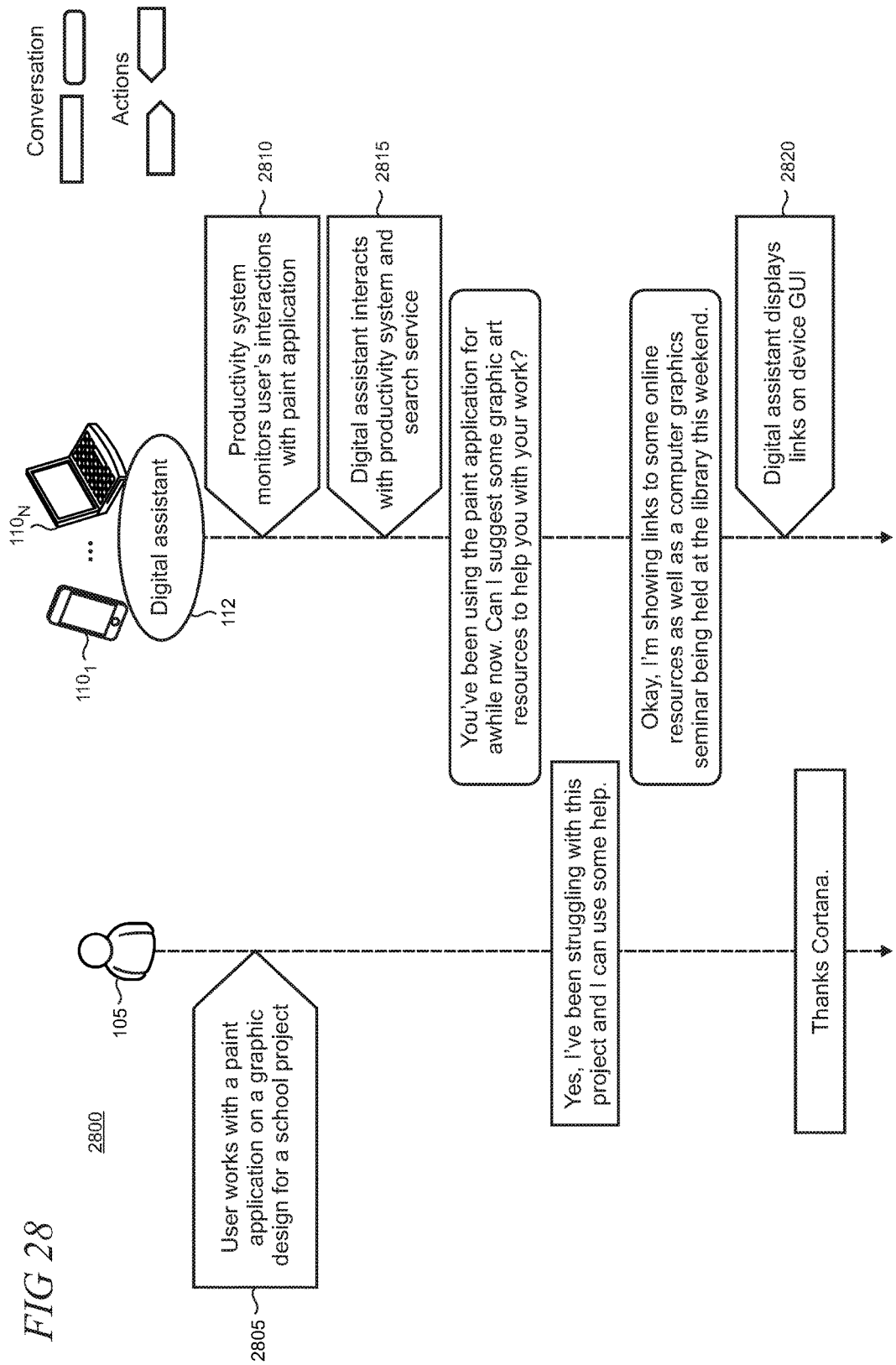

FIG. 28 shows an illustrative transcript for a use scenario 2800 in which the digital assistant 112 interacts with the productivity system 505 (FIG. 5) and search service 140 (FIG. 1) to identify and suggest tools and resources to help improve the user's productivity. In this example, the user is working with a paint application on a graphic design for a school project, as shown at block 2805. The productivity system monitors the user's interactions with the paint application at block 2810. At block 2815, the digital assistant interacts with the productivity system and determines that the user appears to be spending an inordinate amount of time with the paint program and may need assistance. The digital assistant can communicate with the search service 140 to identify resources that may assist the user with the graphic design. In this example, the digital assistant provides links to online resources and a seminar at the user's local public library at block 2820.

Figure 29:
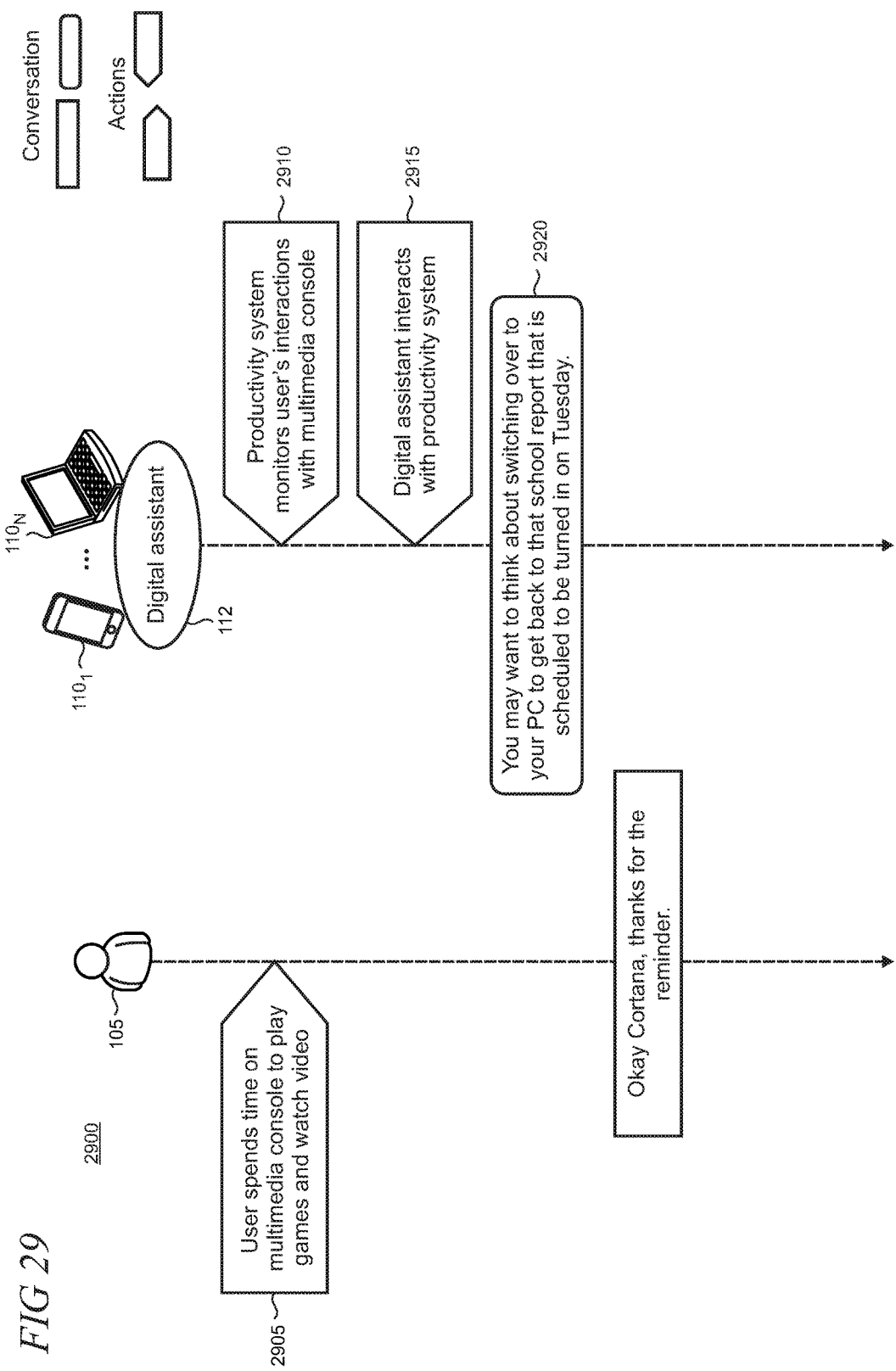

FIG. 29 shows an illustrative transcript for a use scenario 2900 in which the digital assistant 112 interacts with the productivity system 505 (FIG. 5) to suggest strategies for use of entertainment applications to the user that may enhance productivity. In this example, as shown at block 2905, the user spends time on a multimedia console to play games and watch video using various entertainment applications. The productivity system monitors the entertainment applications at block 2910. At block 2915, the digital assistant interacts with the productivity system to determine that the user may be spending excessive time with the entertainment applications and suggests an alternative use of time that may help the user meet her productivity goals at block 2920. Alternatively, the productivity system may report that the user's productivity typically improves after a gaming session on the multimedia console. In this case, in a similar manner as with the exercise scenario described above in the text accompanying FIG. 25, the digital assistant may suggest that the user take a break and engage in some gaming on the multimedia console as a strategy to improve productivity.

Figure 30:
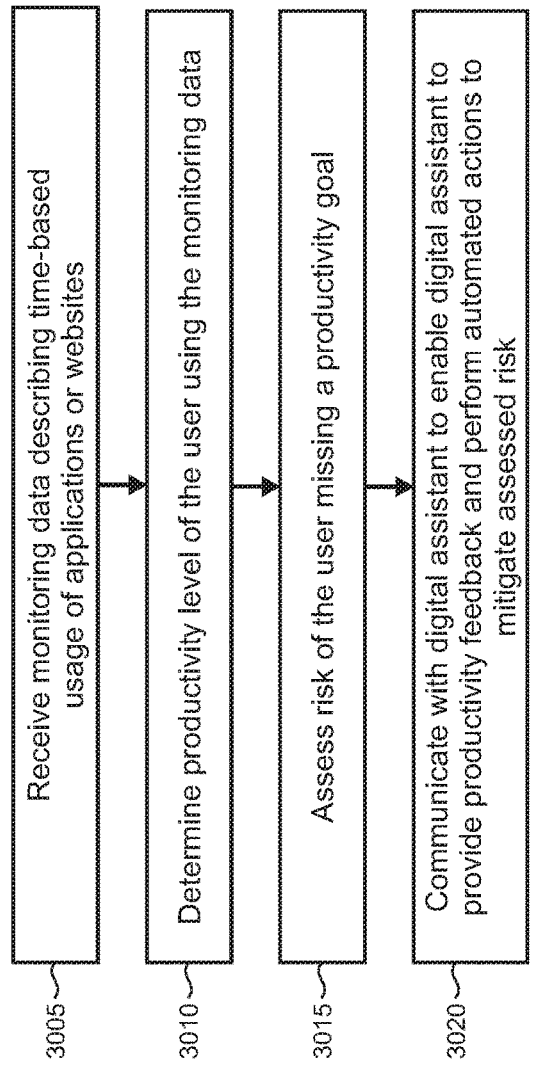
FIGS. 30, 31, and 32 show illustrative methods that may be performed when implementing the present intelligent productivity monitoring with a digital assistant.

FIG. 30 shows a flowchart of an illustrative method 3000 that may be performed on computer server associated with the productivity service 220 (FIG. 2) or digital assistant service 135 (FIG. 1). Unless specifically stated, methods or steps shown in the flowcharts and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

In block 3005, the server receives monitoring data from one or more computing devices associated with a user. The monitoring data describes time-based usage of applications or websites by the user. The monitoring data can be collected by the application and browser monitors in the productivity system 505 (FIG. 5). In block 3010, a level of productivity is determined by which the time-based usage of the applications or websites is compared against a productivity goal associated with the user. In block 3015, a risk that the user misses the productivity goal is assessed. Available contextual data may be used in the risk assessment as described above. In block 3020, the server communicates with a digital assistant that is instantiated on the one or more computing devices to enable the digital assistant to provide productivity feedback to the user as well as perform automated actions on the one or more computing devices to mitigate the assessed risk. The server can aggregate the time-based usage of applications and websites by type to enhance the productivity feedback provided by the digital assistant in some cases. The server can also correlate user behaviors with the productivity level determined at block 3010. As noted above, such correlation may be utilized when determining a course of action to take to assist the user in reaching a productivity goal.

Figure 31:
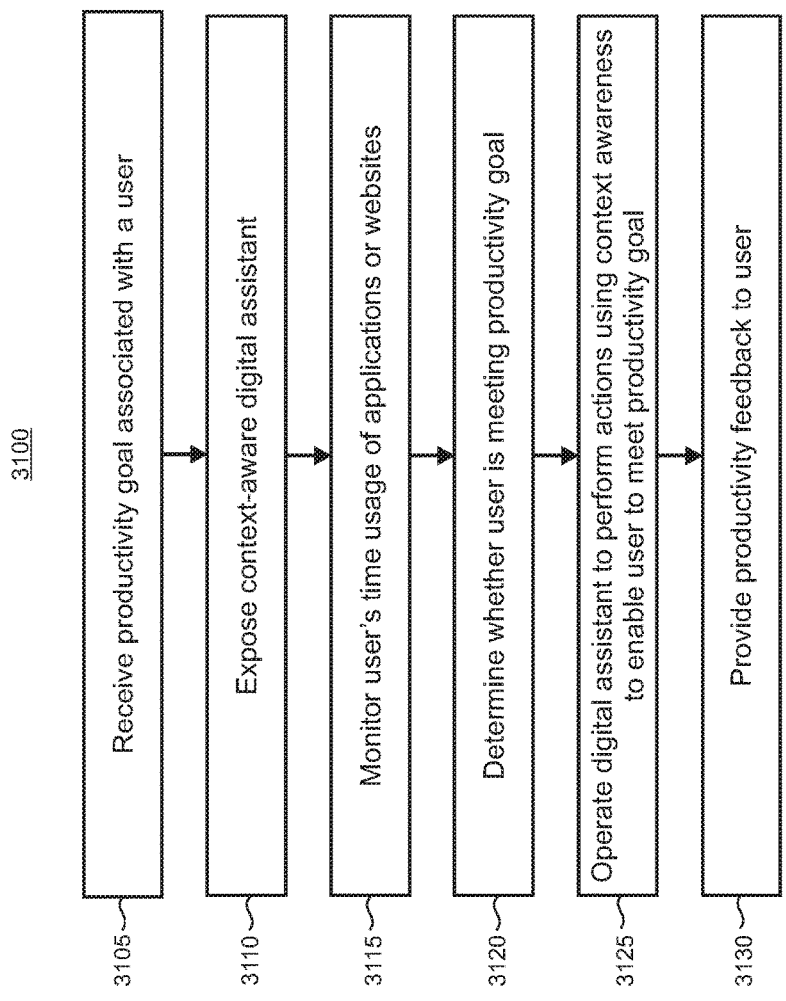

FIG. 31 shows a flowchart of an illustrative method 3100 that may be performed by a device (e.g., a device 110 in FIG. 1). In block 3105, a productivity goal associated with a device user is received in which the goal pertains to the user's utilization of selected applications or websites. In block 3110, a context-aware digital assistant is exposed on the device to the user in which the context-awareness is maintained by monitoring user behavior or interactions with the device, or by accessing contextual data that is associated with the user or device. For example, as described in the text accompanying FIG. 6, contextual data can be obtained from a variety of sources including device sensors, user inputs, and externally sourced data.

In block 3115, the user's time usage of applications or websites is monitored, for example, using the application and browser monitors. In block 3120, a determination is made as to whether the user is meeting the productivity goal. In some implementations, the determination may be made by the remote productivity service 220 (FIG. 2), while in other implementations the determination can be made locally at the device. In block 3125, the digital assistant is operated to perform actions using the context awareness. The tasks enable the user to increase utilization of the selected applications or websites to meet the productivity goal. In block 3130, the digital assistant can provide visual or auditory productivity feedback to the user.

Figure 32:
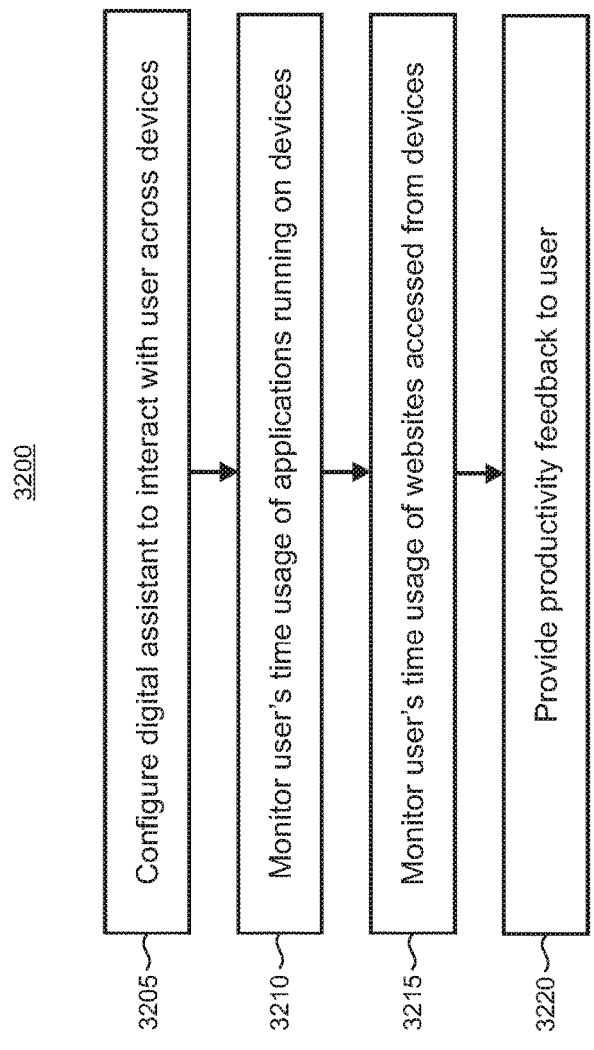

FIG. 32 shows a flowchart of an illustrative method 3200 that may be performed by a device (e.g., a device 110 in FIG. 1). In block 3205, a digital assistant is configured to interact with a user across each of one or more devices. Thus, for example, the user can start an interaction with the digital assistant on one device such as a laptop PC, and finish the interaction on another device such as a smartphone. The user's time usage of applications across the devices is monitored in block 3210 and time usage of websites is monitored in block 3215. Productivity feedback is provided to the user in block 3220. The productivity feedback can be provided in light of a goal that is associated with the user using graphs that are rendered on the device display.

Figure 33:
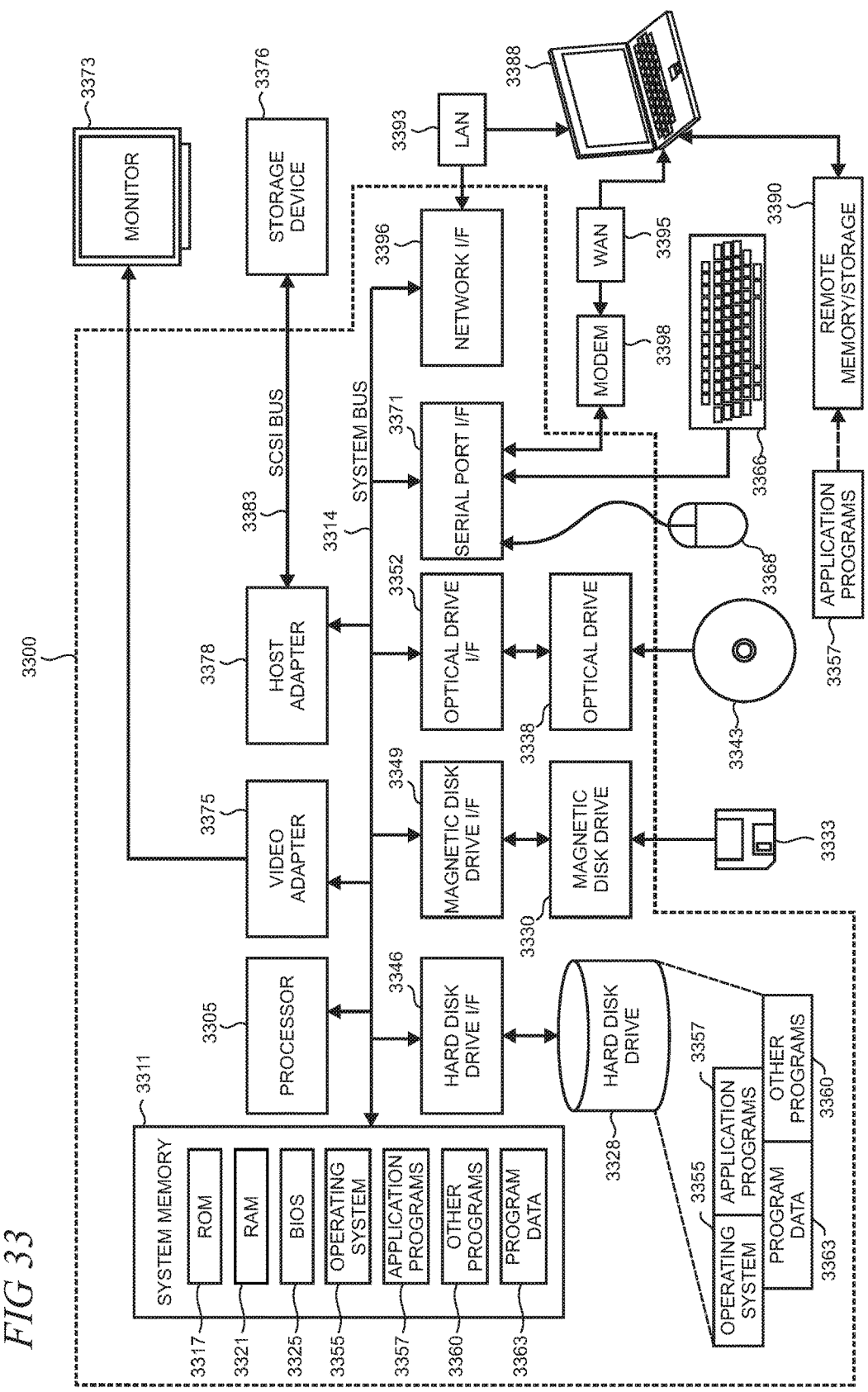
FIG. 33 is a simplified block diagram of an illustrative computer system such as a personal computer (PC) that may be used in part to implement the present intelligent productivity monitoring with a digital assistant.

FIG. 33 is a simplified block diagram of an illustrative computer system 3300 such as a PC, client machine, or server with which the present intelligent productivity monitoring with a digital assistant may be implemented. Computer system 3300 includes a processor 3305, a system memory 3311, and a system bus 3314 that couples various system components including the system memory 3311 to the processor 3305. The system bus 3314 may be any of several types of bus structures including a memory bus or memory controller, a peripheral bus, or a local bus using any of a variety of bus architectures. The system memory 3311 includes read only memory (ROM) 3317 and random access memory (RAM) 3321. A basic input/output system (BIOS) 3325, containing the basic routines that help to transfer information between elements within the computer system 3300, such as during startup, is stored in ROM 3317. The computer system 3300 may further include a hard disk drive 3328 for reading from and writing to an internally disposed hard disk (not shown), a magnetic disk drive 3330 for reading from or writing to a removable magnetic disk 3333 (e.g., a floppy disk), and an optical disk drive 3338 for reading from or writing to a removable optical disk 3343 such as a CD (compact disc), DVD (digital versatile disc), or other optical media. The hard disk drive 3328, magnetic disk drive 3330, and optical disk drive 3338 are connected to the system bus 3314 by a hard disk drive interface 3346, a magnetic disk drive interface 3349, and an optical drive interface 3352, respectively. The drives and their associated computer-readable storage media provide non-volatile storage of computer-readable instructions, data structures, program modules, and other data for the computer system 3300. Although this illustrative example includes a hard disk, a removable magnetic disk 3333, and a removable optical disk 3343, other types of computer-readable storage media which can store data that is accessible by a computer such as magnetic cassettes, Flash memory cards, digital video disks, data cartridges, random access memories (RAMs), read only memories (ROMs), and the like may also be used in some applications of the present intelligent productivity monitoring with a digital assistant. In addition, as used herein, the term computer-readable storage media includes one or more instances of a media type (e.g., one or more magnetic disks, one or more CDs, etc.). For purposes of this specification and the claims, the phrase "computer-readable storage media" and variations thereof, does not include waves, signals, and/or other transitory and/or intangible communication media.

A number of program modules may be stored on the hard disk, magnetic disk 3333, optical disk 3343, ROM 3317, or RAM 3321, including an operating system 3355, one or more application programs 3357, other program modules 3360, and program data 3363. A user may enter commands and information into the computer system 3300 through input devices such as a keyboard 3366 and pointing device 3368 such as a mouse. Other input devices (not shown) may include a microphone, joystick, game pad, satellite dish, scanner, trackball, touchpad, touchscreen, touch-sensitive device, voice-command module or device, user motion or user gesture capture device, or the like. These and other input devices are often connected to the processor 3305 through a serial port interface 3371 that is coupled to the system bus 3314, but may be connected by other interfaces, such as a parallel port, game port, or universal serial bus (USB). A monitor 3373 or other type of display device is also connected to the system bus 3314 via an interface, such as a video adapter 3375. In addition to the monitor 3373, personal computers typically include other peripheral output devices (not shown), such as speakers and printers. The illustrative example shown in FIG. 33 also includes a host adapter 3378, a Small Computer System Interface (SCSI) bus 3383, and an external storage device 3376 connected to the SCSI bus 3383.

The computer system 3300 is operable in a networked environment using logical connections to one or more remote computers, such as a remote computer 3388. The remote computer 3388 may be selected as another personal computer, a server, a router, a network PC, a peer device, or other common network node, and typically includes many or all of the elements described above relative to the computer system 3300, although only a single representative remote memory/storage device 3390 is shown in FIG. 33. The logical connections depicted in FIG. 33 include a local area network (LAN) 3393 and a wide area network (WAN) 3395. Such networking environments are often deployed, for example, in offices, enterprise-wide computer networks, intranets, and the Internet.

When used in a LAN networking environment, the computer system 3300 is connected to the local area network 3393 through a network interface or adapter 3396. When used in a WAN networking environment, the computer system 3300 typically includes a broadband modem 3398, network gateway, or other means for establishing communications over the wide area network 3395, such as the Internet. The broadband modem 3398, which may be internal or external, is connected to the system bus 3314 via a serial port interface 3371. In a networked environment, program modules related to the computer system 3300, or portions thereof, may be stored in the remote memory storage device 3390. It is noted that the network connections shown in FIG. 33 are illustrative and other means of establishing a communications link between the computers may be used depending on the specific requirements of an application of the present intelligent productivity monitoring with a digital assistant.

Figure 34:
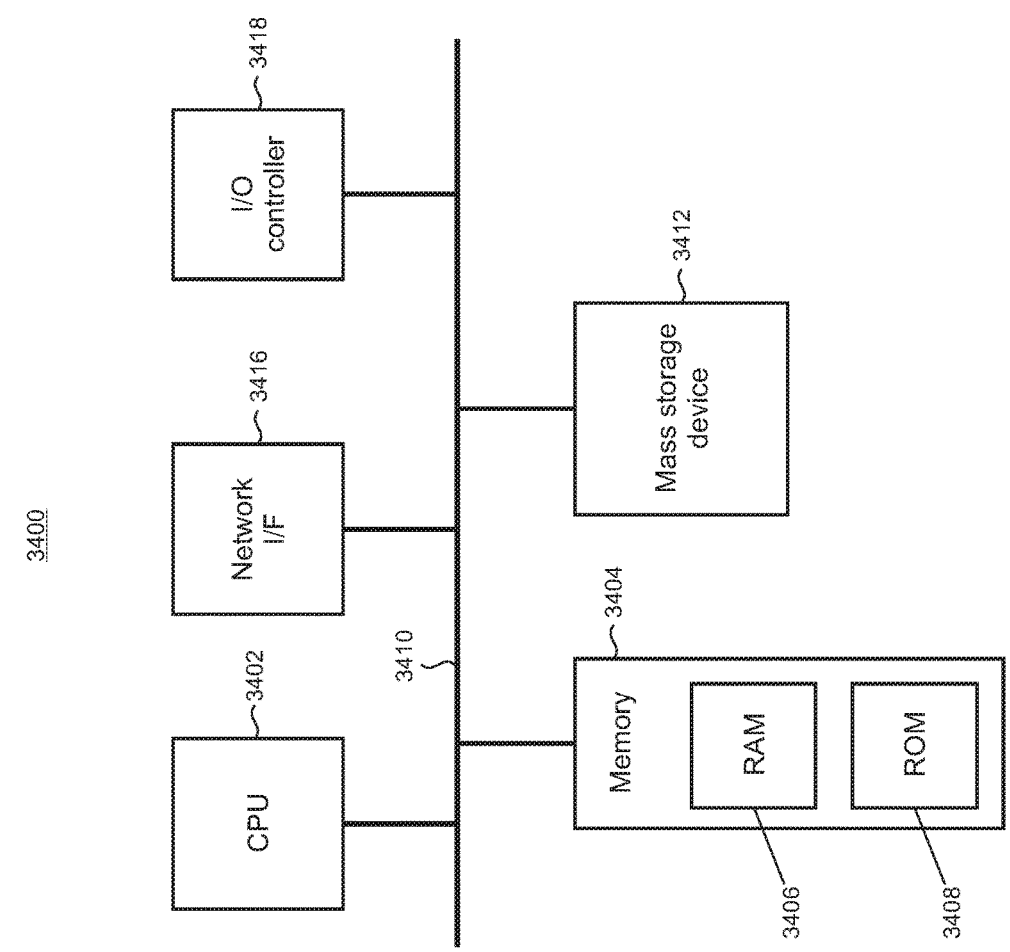
FIG. 34 shows a block diagram of an illustrative device that may be used in part to implement the present intelligent productivity monitoring with a digital assistant.

FIG. 34 shows an illustrative architecture 3400 for a device capable of executing the various components described herein for providing the present intelligent productivity monitoring with a digital assistant. Thus, the architecture 3400 illustrated in FIG. 34 shows an architecture that may be adapted for a server computer, mobile phone, a PDA, a smartphone, a desktop computer, a netbook computer, a tablet computer, GPS device, gaming console, and/or a laptop computer. The architecture 3400 may be utilized to execute any aspect of the components presented herein.

The architecture 3400 illustrated in FIG. 34 includes a CPU (Central Processing Unit) 3402, a system memory 3404, including a RAM 3406 and a ROM 3408, and a system bus 3410 that couples the memory 3404 to the CPU 3402. A basic input/output system containing the basic routines that help to transfer information between elements within the architecture 3400, such as during startup, is stored in the ROM 3408. The architecture 3400 further includes a mass storage device 3412 for storing software code or other computer-executed code that is utilized to implement applications, the file system, and the operating system.

The mass storage device 3412 is connected to the CPU 3402 through a mass storage controller (not shown) connected to the bus 3410. The mass storage device 3412 and its associated computer-readable storage media provide non-volatile storage for the architecture 3400.

Although the description of computer-readable storage media contained herein refers to a mass storage device, such as a hard disk or CD-ROM drive, it may be appreciated by those skilled in the art that computer-readable storage media can be any available storage media that can be accessed by the architecture 3400.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray, or other optical storage, magnetic cassettes, magnetic tape, magnetic disk storage or other magnetic storage devices, or any other medium which can be used to store the desired information and which can be accessed by the architecture 3400.

According to various embodiments, the architecture 3400 may operate in a networked environment using logical connections to remote computers through a network. The architecture 3400 may connect to the network through a network interface unit 3416 connected to the bus 3410. It may be appreciated that the network interface unit 3416 also may be utilized to connect to other types of networks and remote computer systems. The architecture 3400 also may include an input/output controller 3418 for receiving and processing input from a number of other devices, including a keyboard, mouse, or electronic stylus (not shown in FIG. 34). Similarly, the input/output controller 3418 may provide output to a display screen, a printer, or other type of output device (also not shown in FIG. 34).

It may be appreciated that the software components described herein may, when loaded into the CPU 3402 and executed, transform the CPU 3402 and the overall architecture 3400 from a general-purpose computing system into a special-purpose computing system customized to facilitate the functionality presented herein. The CPU 3402 may be constructed from any number of transistors or other discrete circuit elements, which may individually or collectively assume any number of states. More specifically, the CPU 3402 may operate as a finite-state machine, in response to executable instructions contained within the software modules disclosed herein. These computer-executable instructions may transform the CPU 3402 by specifying how the CPU 3402 transitions between states, thereby transforming the transistors or other discrete hardware elements constituting the CPU 3402.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 3400 in order to store and execute the software components presented herein. It also may be appreciated that the architecture 3400 may include other types of computing devices, including handheld computers, embedded computer systems, smartphones, PDAs, and other types of computing devices known to those skilled in the art. It is also contemplated that the architecture 3400 may not include all of the components shown in FIG. 34, may include other components that are not explicitly shown in FIG. 34, or may utilize an architecture completely different from that shown in FIG. 34.

Figure 35:
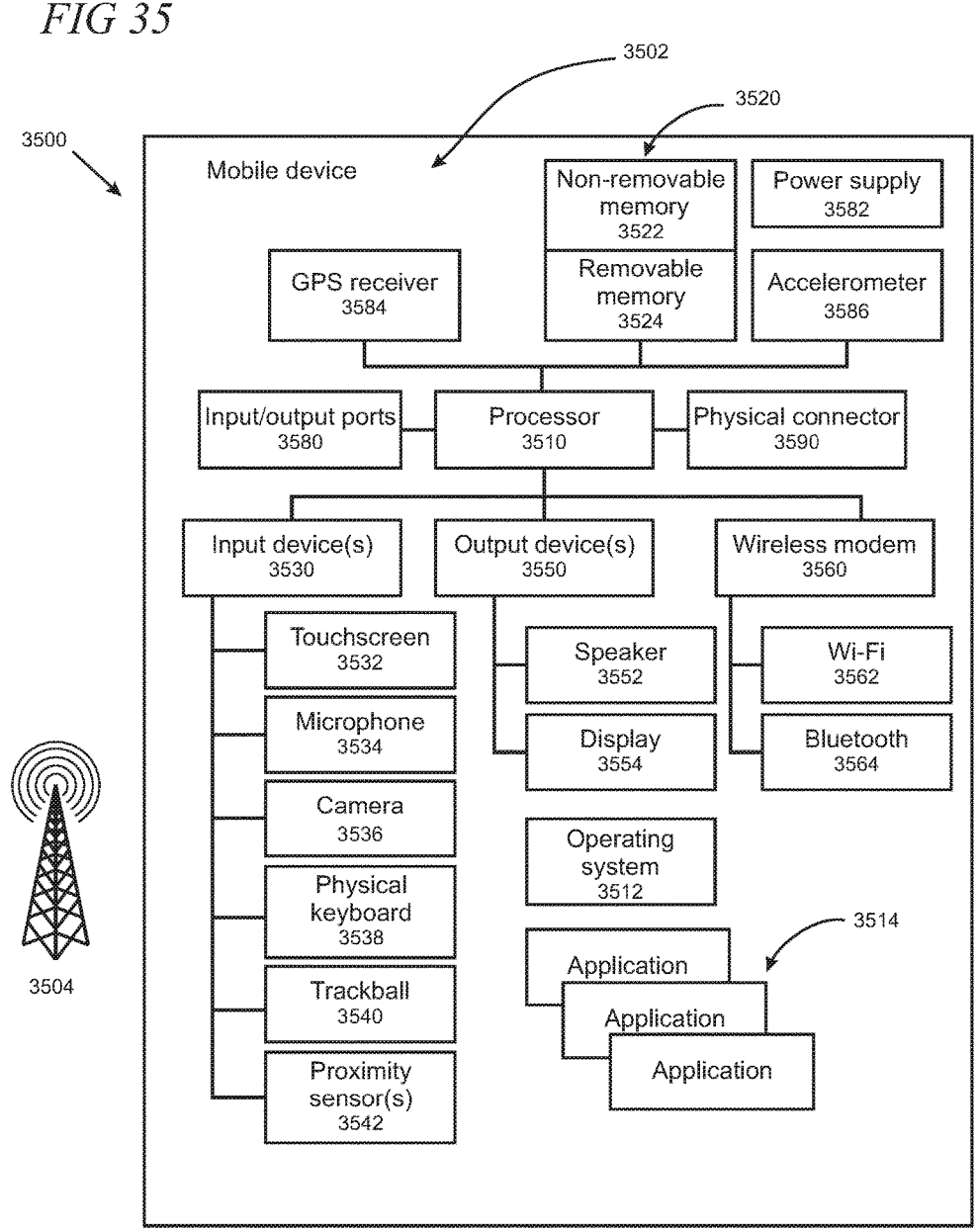
FIG. 35 is a block diagram of an illustrative device such as a mobile phone or smartphone.

FIG. 35 is a functional block diagram of an illustrative device 3500 such as a mobile phone or smartphone including a variety of optional hardware and software components, shown generally at 3502. Any component 3502 in the mobile device can communicate with any other component, although, for ease of illustration, not all connections are shown. The mobile device can be any of a variety of computing devices (e.g., cell phone, smartphone, handheld computer, PDA, etc.) and can allow wireless two-way communications with one or more mobile communication networks 3504, such as a cellular or satellite network.

The illustrated device 3500 can include a controller or processor 3510 (e.g., signal processor, microprocessor, microcontroller, ASIC (Application Specific Integrated Circuit), or other control and processing logic circuitry) for performing such tasks as signal coding, data processing, input/output processing, power control, and/or other functions. An operating system 3512 can control the allocation and usage of the components 3502, including power states, above-lock states, and below-lock states, and provides support for one or more application programs 3514. The application programs can include common mobile computing applications (e.g., image-capture applications, email applications, calendars, contact managers, web browsers, messaging applications), or any other computing application.

The illustrated device 3500 can include memory 3520. Memory 3520 can include non-removable memory 3522 and/or removable memory 3524. The non-removable memory 3522 can include RAM, ROM, Flash memory, a hard disk, or other well-known memory storage technologies. The removable memory 3524 can include Flash memory or a Subscriber Identity Module (SIM) card, which is well known in GSM (Global System for Mobile communications) systems, or other well-known memory storage technologies, such as "smart cards." The memory 3520 can be used for storing data and/or code for running the operating system 3512 and the application programs 3514. Example data can include web pages, text, images, sound files, video data, or other data sets to be sent to and/or received from one or more network servers or other devices via one or more wired or wireless networks.

The memory 3520 may also be arranged as, or include, one or more computer-readable storage media implemented in any method or technology for storage of information such as computer-readable instructions, data structures, program modules or other data. For example, computer-readable media includes, but is not limited to, RAM, ROM, EPROM, EEPROM, Flash memory or other solid state memory technology, CD-ROM (compact-disc ROM), DVD, (Digital Versatile Disc) HD-DVD (High Definition DVD), Blu-ray, or other optical storage, magnetic cassettes, magnetic tape, magnetic disk storage or other magnetic storage devices, or any other medium which can be used to store the desired information and which can be accessed by the device 3500.

The memory 3520 can be used to store a subscriber identifier, such as an International Mobile Subscriber Identity (IMSI), and an equipment identifier, such as an International Mobile Equipment Identifier (IMEI). Such identifiers can be transmitted to a network server to identify users and equipment. The device 3500 can support one or more input devices 3530; such as a touchscreen 3532; microphone 3534 for implementation of voice input for voice recognition, voice commands and the like; camera 3536; physical keyboard 3538; trackball 3540; and/or proximity sensor 3542; and one or more output devices 3550, such as a speaker 3552 and one or more displays 3554. Other input devices (not shown) using gesture recognition may also be utilized in some cases. Other possible output devices (not shown) can include piezoelectric or haptic output devices. Some devices can serve more than one input/output function. For example, touchscreen 3532 and display 3554 can be combined into a single input/output device.

A wireless modem 3560 can be coupled to an antenna (not shown) and can support two-way communications between the processor 3510 and external devices, as is well understood in the art. The modem 3560 is shown generically and can include a cellular modem for communicating with the mobile communication network 3504 and/or other radio-based modems (e.g., Bluetooth 3564 or Wi-Fi 3562). The wireless modem 3560 is typically configured for communication with one or more cellular networks, such as a GSM network for data and voice communications within a single cellular network, between cellular networks, or between the device and a public switched telephone network (PSTN).

The device can further include at least one input/output port 3580, a power supply 3582, a satellite navigation system receiver 3584, such as a GPS receiver, an accelerometer 3586, a gyroscope (not shown), and/or a physical connector 3590, which can be a USB port, IEEE 1394 (FireWire) port, and/or an RS-232 port. The illustrated components 3502 are not required or all-inclusive, as any components can be deleted and other components can be added.

Figure 36:
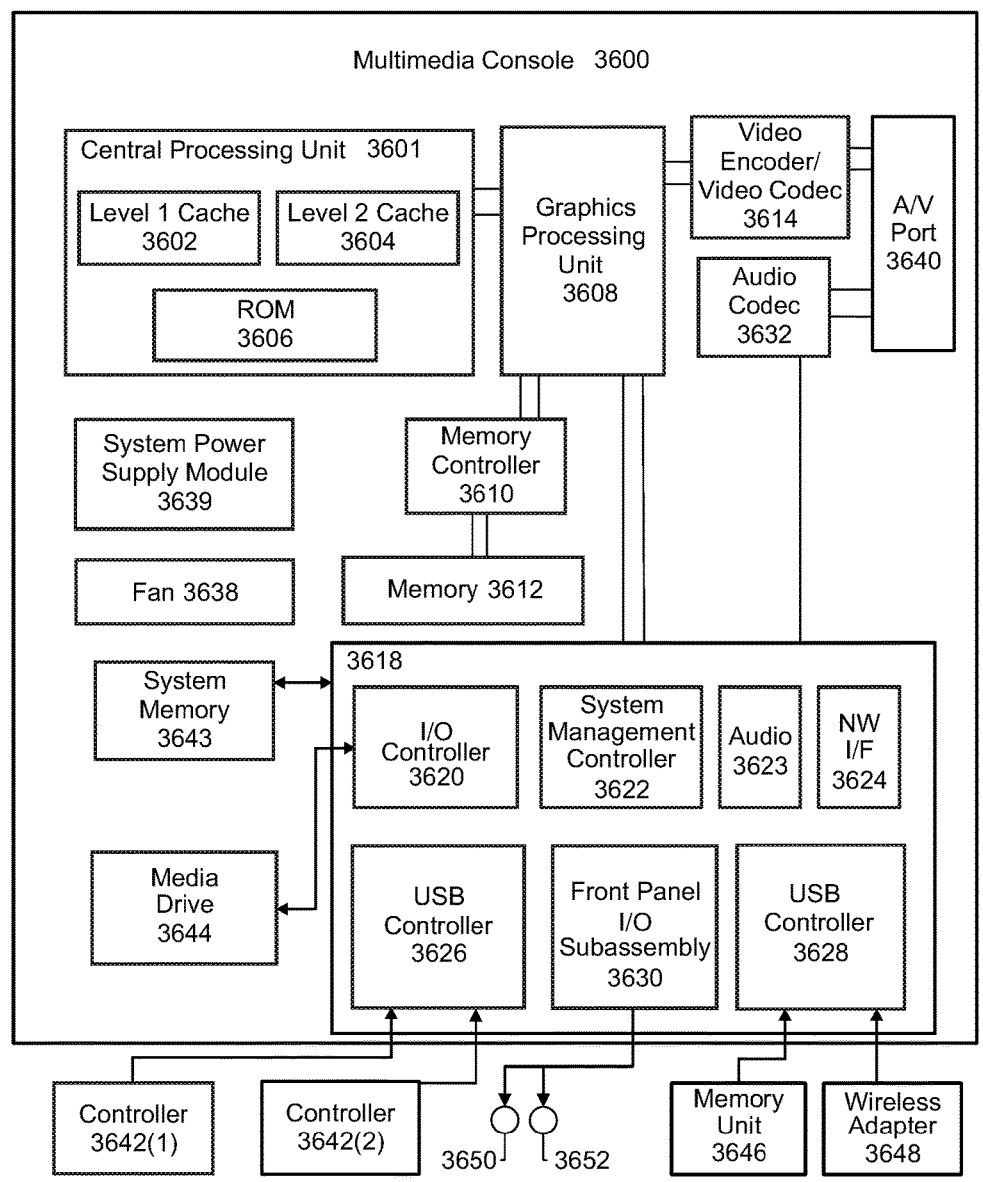
FIG. 36 is a block diagram of an illustrative multimedia console.

FIG. 36 is an illustrative functional block diagram of a multimedia console 3600. The multimedia console 3600 has a central processing unit (CPU) 3601 having a level 1 cache 3602, a level 2 cache 3604, and a Flash ROM (Read Only Memory) 3606. The level 1 cache 3602 and the level 2 cache 3604 temporarily store data and hence reduce the number of memory access cycles, thereby improving processing speed and throughput. The CPU 3601 may be configured with more than one core, and thus, additional level 1 and level 2 caches 3602 and 3604. The Flash ROM 3606 may store executable code that is loaded during an initial phase of a boot process when the multimedia console 3600 is powered ON.

A graphics processing unit (GPU) 3608 and a video encoder/video codec (coder/decoder) 3614 form a video processing pipeline for high speed and high resolution graphics processing. Data is carried from the GPU 3608 to the video encoder/video codec 3614 via a bus. The video processing pipeline outputs data to an A/V (audio/video) port 3640 for transmission to a television or other display. A memory controller 3610 is connected to the GPU 3608 to facilitate processor access to various types of memory 3612, such as, but not limited to, a RAM.

The multimedia console 3600 includes an I/O controller 3620, a system management controller 3622, an audio processing unit 3623, a network interface controller 3624, a first USB (Universal Serial Bus) host controller 3626, a second USB controller 3628, and a front panel I/O subassembly 3630 that are preferably implemented on a module 3618. The USB controllers 3626 and 3628 serve as hosts for peripheral controllers 3642(1) and 3642(2), a wireless adapter 3648, and an external memory device 3646 (e.g., Flash memory, external CD/DVD ROM drive, removable media, etc.). The network interface controller 3624 and/or wireless adapter 3648 provide access to a network (e.g., the Internet, home network, etc.) and may be any of a wide variety of various wired or wireless adapter components including an Ethernet card, a modem, a Bluetooth module, a cable modem, or the like.

System memory 3643 is provided to store application data that is loaded during the boot process. A media drive 3644 is provided and may comprise a DVD/CD drive, hard drive, or other removable media drive, etc. The media drive 3644 may be internal or external to the multimedia console 3600. Application data may be accessed via the media drive 3644 for execution, playback, etc. by the multimedia console 3600. The media drive 3644 is connected to the I/O controller 3620 via a bus, such as a Serial ATA bus or other high speed connection (e.g., IEEE 1394).

The system management controller 3622 provides a variety of service functions related to assuring availability of the multimedia console 3600. The audio processing unit 3623 and an audio codec 3632 form a corresponding audio processing pipeline with high fidelity and stereo processing. Audio data is carried between the audio processing unit 3623 and the audio codec 3632 via a communication link. The audio processing pipeline outputs data to the A/V port 3640 for reproduction by an external audio player or device having audio capabilities.

The front panel I/O subassembly 3630 supports the functionality of the power button 3650 and the eject button 3652, as well as any LEDs (light emitting diodes) or other indicators exposed on the outer surface of the multimedia console 3600. A system power supply module 3639 provides power to the components of the multimedia console 3600. A fan 3638 cools the circuitry within the multimedia console 3600.

The CPU 3601, GPU 3608, memory controller 3610, and various other components within the multimedia console 3600 are interconnected via one or more buses, including serial and parallel buses, a memory bus, a peripheral bus, and a processor or local bus using any of a variety of bus architectures. By way of example, such architectures can include a Peripheral Component Interconnects (PCI) bus, PCI-Express bus, etc.

When the multimedia console 3600 is powered ON, application data may be loaded from the system memory 3643 into memory 3612 and/or caches 3602 and 3604 and executed on the CPU 3601. The application may present a graphical user interface that provides a consistent user experience when navigating to different media types available on the multimedia console 3600. In operation, applications and/or other media contained within the media drive 3644 may be launched or played from the media drive 3644 to provide additional functionalities to the multimedia console 3600.

The multimedia console 3600 may be operated as a standalone system by simply connecting the system to a television or other display. In this standalone mode, the multimedia console 3600 allows one or more users to interact with the system, watch movies, or listen to music. However, with the integration of broadband connectivity made available through the network interface controller 3624 or the wireless adapter 3648, the multimedia console 3600 may further be operated as a participant in a larger network community.

When the multimedia console 3600 is powered ON, a set amount of hardware resources are reserved for system use by the multimedia console operating system. These resources may include a reservation of memory (e.g., 16 MB), CPU and GPU cycles (e.g., 5%), networking bandwidth (e.g., 8 kbps), etc. Because these resources are reserved at system boot time, the reserved resources do not exist from the application's view.

In particular, the memory reservation preferably is large enough to contain the launch kernel, concurrent system applications, and drivers. The CPU reservation is preferably constant such that if the reserved CPU usage is not used by the system applications, an idle thread will consume any unused cycles.

With regard to the GPU reservation, lightweight messages generated by the system applications (e.g., pop-ups) are displayed by using a GPU interrupt to schedule code to render pop-ups into an overlay. The amount of memory needed for an overlay depends on the overlay area size and the overlay preferably scales with screen resolution. Where a full user interface is used by the concurrent system application, it is preferable to use a resolution independent of application resolution. A scaler may be used to set this resolution such that the need to change frequency and cause a TV re-sync is eliminated.

After the multimedia console 3600 boots and system resources are reserved, concurrent system applications execute to provide system functionalities. The system functionalities are encapsulated in a set of system applications that execute within the reserved system resources described above. The operating system kernel identifies threads that are system application threads versus gaming application threads. The system applications are preferably scheduled to run on the CPU 3601 at predetermined times and intervals in order to provide a consistent system resource view to the application. The scheduling is to minimize cache disruption for the gaming application running on the console.

When a concurrent system application requires audio, audio processing is scheduled asynchronously to the gaming application due to time sensitivity. A multimedia console application manager (described below) controls the gaming application audio level (e.g., mute, attenuate) when system applications are active.

Input devices (e.g., controllers 3642(1) and 3642(2)) are shared by gaming applications and system applications. The input devices are not reserved resources, but are to be switched between system applications and the gaming application such that each will have a focus of the device. The application manager preferably controls the switching of input stream, without knowledge of the gaming application's knowledge and a driver maintains state information regarding focus switches.

Various exemplary embodiments of the present intelligent productivity monitoring with a digital assistant are now presented by way of illustration and not as an exhaustive list of all embodiments. An example includes one or more computer-readable memory devices storing instructions which, when executed by one or more processors disposed in a computer server, cause the computer server to: receive monitoring data from one or more computing devices associated with a user in which the monitoring data describes time-based usage of applications or websites by the user; determine a level of productivity of the user using the monitoring data, in which the determination compares the time-based usage against a productivity goal associated with the user; assess a risk that the user misses the productivity goal; and communicate with a digital assistant instantiated on the one or more computing devices so that the digital assistant is enabled to i) provide productivity feedback to the user, and ii) perform automated actions on the one or more computing devices to mitigate against the assessed risk.

In another example, the executed instructions cause the computer server to correlate user behaviors with productivity level. In another example, the executed instructions cause the computer server to receive user behavior data describing user behaviors with the one or more devices and contextual data describing context associated with the user, and in which the computer server employs the user behavior data or the contextual data to determine the risk or determine the automated actions performed by the digital assistant. In another example, the automated actions increase the level of productivity by reducing occurrences of non-automated actions performed by the user on the one or more computing devices. In another example, the executed instructions cause the computer server to classify applications or websites accessed by the user from the one or more computing devices wherein the classification is by type or category. In another example, the executed instructions cause the computer server to aggregate the time-based usage of applications across applications sharing a common type and further to aggregate the time-based usage of websites across websites sharing a common type, and wherein the productivity feedback utilizes the aggregated time-based usage of applications or websites.

A further example includes a device, comprising: one or more processors; a user interface (UI) configured to interact with a user of the device; and a hardware-based memory device storing computer-readable instructions which, when executed by the one or more processors, cause the device to receive a productivity goal associated with the user with respect to the user's utilization of selected applications or websites, expose a digital assistant on the device, the digital assistant configured to maintain context awareness by monitoring user behavior or user interactions with the device, or by accessing contextual data associated with the user or device, determine whether the user is meeting the productivity goal, operate the digital assistant to perform actions using the context awareness, wherein the action automates tasks on behalf of the user to thereby enable the user to increase the utilization of the selected applications or websites to meet the productivity goal.

In another example, the executed instructions further cause the device to receive an interaction from the user of the digital assistant using one of voice, physical interaction, or gesture. In another example, the executed instructions further cause the device to monitor the user's time usage of applications or websites and wherein the monitored time usage is employed to maintain the context awareness. In another example, the determination comprises receiving a notification from a remote service describing the user's progress towards the productivity goal. In another example, the executed instructions further cause the device to maintain context awareness using data comprising one or more of time/date, location of the user or device, language, schedule, applications installed on the device, user preferences, user behaviors, user activities, stored contacts, call history, messaging history, browsing history, application usage history, device type, device capabilities, or communication network type. In another example, the executed instructions further cause the device to utilize the digital assistant to provide productivity feedback to the user through the UI. In another example, the productivity feedback is provided to the user through the UI in one or more of graphical form or auditory form. In another example, the context awareness is further maintained by using sensor data collected by sensors on the device, the sensors including one or more of camera, accelerometer, location-awareness component, thermometer, altimeter, heart rate sensor, barometer, microphone, or proximity sensor. In another example, the action comprises one or more of sharing contact information, reading an email to identify tasks contained therein, adding a task to a task list, scheduling a meeting or appointment, interacting with a user's calendar, making a telephone call, sending a message, operating a device, making a reservation, providing a reminder to the user, making a purchase, suggesting a workout, playing music, taking notes, providing information to the user or another party, answering a question from the user or another party, setting an alarm or reminder, checking social media for updates, visiting a website, interacting with a search service, sharing or showing files, sending a link to a website, or sending a link to a resource.

A further example includes a method for providing productivity feedback to a user of one or more computing devices, comprising: configuring a digital assistant to interact with the user across each of the one or more devices using at least one of voice, physical interaction, or sensed gesture and collect contextual data associated with the user; monitoring the user's usage time for each of a plurality of applications running on the one or more devices; and providing productivity feedback using the digital assistant to the user pertaining to usage of the applications using verbal interactions or graphic rendering on a display device associated with the one or more devices, wherein the digital assistant is configured to use applicable contextual data when interacting with the user and providing the productivity feedback to the user.

In another example, the method further comprises providing the productivity feedback to the user using a graph that the digital assistant renders on a display associated with the one or more computing devices. In another example, the method further comprises receiving a productivity goal associated with the user and wherein the digital assistant provides productivity feedback to indicate the user's progress with respect to the productivity goal. In another example, the method further comprises configuring the digital assistant to enable the user to set a productivity goal and wherein the productivity feedback provided to the user is at least partially based on the productivity goal. In another example, the method further comprises monitoring the user's usage time for each of a plurality of websites accessed from the one or more devices and providing productivity feedback regarding utilization of the websites.

Based on the foregoing, it may be appreciated that technologies for intelligent productivity monitoring with a digital assistant have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims.

Based on the foregoing, it may be appreciated that technologies for intelligent productivity monitoring with a digital assistant have been disclosed herein. Although the subject matter presented herein has been described in language specific to computer structural features, methodological and transformative acts, specific computing machinery, and computer-readable storage media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and is not be construed as limiting. Various modifications and changes may be made to the subject matter described herein without following the example embodiments and applications illustrated and described, and without departing from the true spirit and scope of the present invention, which is set forth in the following claims.

What is claimed:

1. One or more computer-readable memory devices storing instructions which, when executed by one or more processors disposed in a computer server, cause the computer server to:
   classify applications accessed by a user from one or more computing devices wherein the classifying is by application type;
   receive monitoring data from the one or more computing devices associated with the user in which the monitoring data describes time-based usage of applications by the user;
   aggregate the time-based usage for applications that share a common application type;
   determine a level of productivity of the user using the monitoring data, in which the determination compares the time-based usage against a productivity goal associated with the user;

communicate productivity feedback to the one or more computing devices associated with the user, wherein the productivity feedback includes the productivity goal and a graph with multiple representations, and each representation in the graph is configured with the aggregated time-based usage for each respective application type.

2. The one or more computer-readable memory devices of claim 1 in which the executed instructions further cause the computer server to correlate user behaviors with productivity level.

3. The one or more computer-readable memory devices of claim 1 in which the executed instructions further cause the computer server to receive user behavior data describing user behaviors with the one or more computing devices and contextual data describing context associated with the user, and in which the computer server employs the user behavior data or the contextual data to assess a risk that the user misses the productivity goal or determine automated actions to be performed by the digital assistant on the one or more computing devices to mitigate against the assessed risk.

4. The one or more computer-readable memory devices of claim 3 in which the automated actions increase the level of productivity by reducing occurrences of non-automated actions performed by the user on the one or more computing devices.

5. The one or more computer-readable memory devices of claim 1 in which the executed instructions further cause the computer server to aggregate the time-based usage of websites across websites sharing a common type.

6. A device, comprising:
one or more processors;
a user interface (UI) configured to interact with a user of the device; and
a hardware-based memory device storing computer-readable instructions which, when executed by the one or more processors, cause the device to
expose controls on the device which enable the user to set criteria by which to trigger an alert based on a duration of time the user interacts with applications, wherein the criteria are set according to application type,
receive criteria through the controls with respect to the user's utilization of applications, in which the criteria are set according to application type,
monitor user behaviors or user interactions with the applications on the device, or by accessing contextual data associated with the user or device,
determine whether the user is meeting the criteria using the monitored user behaviors or user interactions, and
alert the user, on the UI based on the determination.

7. The device of claim 6 in which the executed instructions further cause the device to receive an interaction from the user using one of voice, physical interaction, or gesture.

8. The device of claim 6 in which the executed instructions further cause the device to monitor the user's time usage of applications or websites and wherein the monitored time usage is employed to determine whether the user is meeting the set criteria.

9. The device of claim 6 in which the determination comprises receiving a notification from a remote service describing the user's progress towards the criteria.

10. The device of claim 6 in which the monitored user behaviors or user interactions are further based on data comprising one or more of time/date, location of the user or device, language, schedule, applications installed on the device, user preferences, user behaviors, user activities, stored contacts, call history, messaging history, browsing history, application usage history, device type, device capabilities, or communication network type.

11. The device of claim 6 in which the executed instructions further cause the device to utilize a digital assistant to provide productivity feedback to the user through the UI.

12. The device of claim 11 in which the productivity feedback is provided to the user through the UI in one or more of graphical form or auditory form.

13. The device of claim 6 in which the monitored user behaviors or user interactions are maintained by using a digital assistant exposed on the device or by using sensor data collected by sensors on the device, the sensors including one or more of camera, accelerometer, location-awareness component, thermometer, altimeter, heart rate sensor, barometer, microphone, or proximity sensor.

14. The device of claim 6 in which the executed instructions further cause the device to operate the digital assistant to perform an action that automates tasks on behalf of the user to thereby enable the user to meet the criteria, in which the action comprises one or more of sharing contact information, reading an email to identify tasks contained therein, adding a task to a task list, scheduling a meeting or appointment, interacting with a user's calendar, making a telephone call, sending a message, operating a device, making a reservation, providing a reminder to the user, making a purchase, suggesting a workout, playing music, taking notes, providing information to the user or another party, answering a question from the user or another party, setting an alarm or reminder, checking social media for updates, visiting a website, interacting with a search service, sharing or showing files, sending a link to a web site, or sending a link to a resource.

15. A method for providing productivity feedback to a user of one or more computing devices, comprising:
configuring a digital assistant to interact with the user across each of the one or more devices using at least one of voice, physical interaction, or sensed gesture and collect contextual data associated with the user;
set criteria that are received through controls exposed on a user interface (UI) of the one or more computing devices with respect to the user's utilization of applications, in which the criteria are used to trigger an alert based on a duration of time the user interacts with the applications, in which the criteria are set according to application type;
monitoring the user's usage time for the applications running on the one or more computing devices;
determining whether the user is meeting the set criteria using the monitored usage time; and
providing an alert on the UI of the one or more computing devices based on the determination.

16. The method of claim 15 further comprising providing productivity feedback to the user using a graph that the digital assistant renders on a display associated with the one or more computing devices.

17. The method of claim 16 in which the digital assistant provides the productivity feedback to indicate the user's progress with respect to the set criteria.

18. The method of claim 17 further comprising configuring the digital assistant to enable the user to set the criteria and the productivity feedback provided to the user is at least partially based on the criteria.

19. The method of claim 18 further comprising monitoring the user's usage time for each of a plurality of websites accessed from the one or more devices and providing productivity feedback regarding utilization of the websites.

* * * * *